(12) United States Patent
Khoshnevisan et al.

(10) Patent No.: US 12,363,722 B2
(45) Date of Patent: Jul. 15, 2025

(54) SEARCH SPACE SET MONITORING FOR PHYSICAL DOWNLINK CONTROL CHANNEL REPETITION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 17/573,234

(22) Filed: Jan. 11, 2022

(65) Prior Publication Data

US 2022/0225378 A1    Jul. 14, 2022

Related U.S. Application Data

(60) Provisional application No. 63/136,632, filed on Jan. 12, 2021.

(51) Int. Cl.
*H04W 72/23* (2023.01)
*H04L 5/00* (2006.01)

(52) U.S. Cl.
CPC .......... *H04W 72/23* (2023.01); *H04L 5/0094* (2013.01)

(58) Field of Classification Search
CPC .......... H04W 72/20–232; H04L 5/0091–0094
See application file for complete search history.

(56) References Cited

U.S. PATENT DOCUMENTS 11,184,132 B2 * 11/2021 Tsai .................. H04L 27/2627
11,540,147 B2 * 12/2022 Zhang ................ H04L 5/0053
(Continued)

FOREIGN PATENT DOCUMENTS

EP        3691381 A1    8/2020
EP        3944691 A1    1/2022
(Continued)

OTHER PUBLICATIONS

International Search Report and Written Opinion—PCT/US2022/070148—ISA/EPO—May 2, 2022.
(Continued)

*Primary Examiner* — Brendan Y Higa
(74) *Attorney, Agent, or Firm* — Holland & Hart LLP

(57) ABSTRACT

Methods, systems, and devices for wireless communications are described. Generally, physical downlink control channel (PDCCH) candidates in first and second search space (SS) sets may be located in a same slot. When both SS sets have the same periodicity and the same offset, the UE may determine that SS sets are linked. The UE may expect the same number of monitoring occasions for each SS set within the slot, and may determine that a monitoring occasion in the first SS set having a first index value is linked with a monitoring occasion in the second SS set that has the same index value. The UE may determine that monitoring occasions for the different SS sets that have the same periodicity but different offsets are located in different slots, and that rules are satisfied such that a first PDCCH repetition is located in an earlier slot than the second PDDCH repetition.

44 Claims, 14 Drawing Sheets

(56) References Cited

U.S. PATENT DOCUMENTS

| | | | | |
|---|---|---|---|---|
| 11,647,525 | B2* | 5/2023 | Kim | H04L 1/08 |
| | | | | 370/329 |
| 11,711,832 | B2* | 7/2023 | Khoshnevisan | H04L 1/1845 |
| | | | | 370/329 |
| 11,968,647 | B2* | 4/2024 | Hakola | H04W 72/1263 |
| 2019/0045533 | A1* | 2/2019 | Chatterjee | H04W 72/23 |
| 2019/0103943 | A1* | 4/2019 | Wang | H04L 1/1854 |
| 2020/0008235 | A1* | 1/2020 | Sarkis | H04W 72/21 |
| 2020/0187171 | A1* | 6/2020 | Hwang | H04W 72/23 |
| 2020/0280971 | A1 | 9/2020 | Moon et al. | |
| 2020/0413412 | A1* | 12/2020 | Kim | H04W 24/08 |
| 2021/0250944 | A1* | 8/2021 | Ji | H04L 1/08 |
| 2021/0328707 | A1* | 10/2021 | Zhang | H04W 72/0453 |
| 2022/0053468 | A1* | 2/2022 | Chen | H04L 5/0053 |
| 2022/0124686 | A1* | 4/2022 | Lee | H04L 1/00 |
| 2022/0225133 | A1* | 7/2022 | Khoshnevisan | H04L 5/0053 |
| 2022/0264339 | A1* | 8/2022 | Kim | H04B 17/373 |
| 2022/0321285 | A1* | 10/2022 | Khoshnevisan | H04L 5/0003 |
| 2023/0039536 | A1* | 2/2023 | Liu | H04W 72/23 |
| 2023/0120035 | A1* | 4/2023 | Taherzadeh Boroujeni | H04B 17/3912 |
| 2023/0126574 | A1* | 4/2023 | Ji | H04L 5/00 |
| | | | | 370/329 |
| 2023/0156738 | A1* | 5/2023 | Gao | H04L 5/0053 |
| | | | | 370/330 |
| 2023/0413081 | A1* | 12/2023 | Zhang | H04L 5/0035 |
| 2024/0163956 | A1* | 5/2024 | Matsumura | H04W 72/0453 |

FOREIGN PATENT DOCUMENTS

| | | |
|---|---|---|
| WO | WO-2020211096 A1 | 10/2020 |
| WO | WO-2022150333 A1 * | 7/2022 ............... H04L 1/08 |

OTHER PUBLICATIONS

European Search Report—EP24163060—Search Authority—The Hague—Apr. 15, 2024.

* cited by examiner

SEARCH SPACE SET MONITORING FOR PHYSICAL DOWNLINK CONTROL CHANNEL REPETITION

CROSS REFERENCE

The present application for patent claims the benefit of U.S. Provisional Patent Application No. 63/136,632 by KHOSHNEVISAN et al., entitled "SEARCH SPACE SET MONITORING FOR PHYSICAL DOWNLINK CONTROL CHANNEL REPETITION," filed Jan. 12, 2021, assigned to the assignee hereof, and expressly incorporated by reference herein.

FIELD OF TECHNOLOGY

The following relates to wireless communications, including search space set monitoring for physical downlink control channel repetition.

TECHNICAL FIELD

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may support physical downlink control channel (PDCCH) repetition.

SUMMARY

The described techniques relate to improved methods, systems, devices, and apparatuses that support search space (SS) set monitoring for physical downlink control channel (PDCCH) repetition. Generally, a user equipment (UE) may determine whether monitoring occasions of a first SS set are linked to monitoring occasions of a second SS set, when different SS sets are in a same slot or in different slots. For instance, a UE may determine that PDCCH candidates in first and second SS sets are located in the same slot based on a monitoring pattern for SS sets as configured by the base station. When both SS sets have the same periodicity and the same offset, the UE may determine that SS sets located in a same slot are linked. In some examples, the duration of the monitoring pattern may also be the same. In some examples, the UE may expect the same number of monitoring occasions for each SS set within the slot (e.g., a radio resource control (RRC) parameter monitoring symbolsWithinSlot may be the same for each SS set). The UE may determine that each SS set has the same number of monitoring occasions, and that a monitoring occasion in the first SS set having a first index value is linked with a monitoring occasion in the second SS set that has the same index value.

In some examples, the UE may determine that monitoring occasions for the different SS sets are located in different slots based on an indication from the base station, where both SS sets have the same periodicity but different offsets. The UE may determine that one or more rules are satisfied, such that the first PDCCH repetition in the first SS set is always located in an earlier slot than the second PDDCH repetition in the second SS set.

A method for wireless communications at a UE is described. The method may include receiving, from a base station, a configuration that indicates a first monitoring pattern for a first SS set within a transmission time interval and a second monitoring pattern for a second SS set within the transmission time interval, receiving, from the base station, an indication that a first group of downlink control channel candidates in the first SS set are linked with a second group of downlink control channel candidates in the second SS set for downlink control channel repetition, and monitoring the first group of downlink control channel candidates of the first SS set and the second group of downlink control channel candidates of the second SS set based on the first monitoring pattern and the second monitoring pattern having a same periodicity and offset.

An apparatus for wireless communications at a UE is described. The apparatus may include at least one processor, memory coupled (e.g., operatively, communicatively, functionally, electronically, or electrically) to the at least one processor, the memory storing instructions that may be executable by the at least one processor to cause the apparatus to receive, from a base station, a configuration that indicates a first monitoring pattern for a first SS set within a transmission time interval and a second monitoring pattern for a second SS set within the transmission time interval, receive, from the base station, an indication that a first group of downlink control channel candidates in the first SS set are linked with a second group of downlink control channel candidates in the second SS set for downlink control channel repetition, and monitor the first group of downlink control channel candidates of the first SS set and the second group of downlink control channel candidates of the second SS set based on the first monitoring pattern and the second monitoring pattern having a same periodicity and offset.

Another apparatus for wireless communications at a UE is described. The apparatus may include means for receiving, from a base station, a configuration that indicates a first monitoring pattern for a first SS set within a transmission time interval and a second monitoring pattern for a second SS set within the transmission time interval, means for receiving, from the base station, an indication that a first group of downlink control channel candidates in the first SS set are linked with a second group of downlink control channel candidates in the second SS set for downlink control channel repetition, and means for monitoring the first group of downlink control channel candidates of the first SS set and the second group of downlink control channel candidates of the second SS set based on the first monitoring pattern and the second monitoring pattern having a same periodicity and offset.

A non-transitory computer-readable medium storing code for wireless communications at a UE is described. The code may include instructions executable by a processor to receive, from a base station, a configuration that indicates a first monitoring pattern for a first SS set within a transmission time interval and a second monitoring pattern for a second SS set within the transmission time interval, receive, from the base station, an indication that a first group of downlink control channel candidates in the first SS set are linked with a second group of downlink control channel candidates in the second SS set for downlink control channel repetition, and monitor the first group of downlink control channel candidates of the first SS set and the second group of downlink control channel candidates of the second SS set based on the first monitoring pattern and the second monitoring pattern having a same periodicity and offset.

Some examples of the method, apparatuses, and non-transitory computer-readable medium described herein may further include operations, features, means, or instructions for verifying that a number of monitoring occasions of the first monitoring pattern may be the same as a number of monitoring occasions of the second monitoring pattern, where monitoring the first group of downlink control channel candidates and the second group of downlink control channel candidates may be further based on the verification.

Some examples of the method, apparatuses, and non-transitory computer-readable medium described herein may further include operations, features, means, or instructions for determining, based on verifying that the first monitoring pattern and the second monitoring pattern may have the same number of monitoring occasions, that a first monitoring occasion of the first SS set may be linked with a second monitoring occasion of the second SS set.

Some examples of the method, apparatuses, and non-transitory computer-readable medium described herein may further include operations, features, means, or instructions for determining, based on verifying that the first monitoring pattern and the second monitoring pattern may have the same number of monitoring occasions, that monitoring occasions from each of the first SS and the second SS may be linked based on a temporal ordering of monitoring occasions within the first SS and the second SS respectively.

Some examples of the method, apparatuses, and non-transitory computer-readable medium described herein may further include operations, features, means, or instructions for determining, based on verifying that the first monitoring pattern and the second monitoring pattern may have the same number of monitoring occasions, that monitoring occasions from each of the first SS and the second SS may be linked based on an order of index values associated with monitoring occasions within the first SS and the second SS respectively.

Some examples of the method, apparatuses, and non-transitory computer-readable medium described herein may further include operations, features, means, or instructions for determining, based on determining that the first monitoring occasion may be linked with the second monitoring occasion, that a first downlink control channel candidate of the first group of downlink control channel candidates located in the first monitoring occasion may be linked with a second downlink control channel candidate of the second group of downlink control channel candidates located in the second monitoring occasion.

Some examples of the method, apparatuses, and non-transitory computer-readable medium described herein may further include operations, features, means, or instructions for receiving, based on the monitoring, a first repetition of a downlink control message on the first downlink control channel candidate and a second repetition of the downlink control message on the second downlink control channel candidate and combining the first repetition of the downlink control message and the second repetition of the downlink control message.

Some examples of the method, apparatuses, and non-transitory computer-readable medium described herein may further include operations, features, means, or instructions for verifying that a duration of the first SS set within a period of the monitoring pattern may be the same as a duration of the second SS set within a period of the monitoring pattern, where monitoring the first group of downlink control channel candidates and the second group of downlink control channel candidates may be further based on the verification.

A method for wireless communications at a UE is described. The method may include receiving, from a base station, a configuration that indicates a first monitoring pattern for a first SS set within a first transmission time interval and a second monitoring pattern for a second SS set within a second transmission time interval, receiving, from the base station, an indication that a first group of downlink control channel candidates in the first SS set are linked with a second group of downlink control channel candidates in the second SS set for downlink control channel repetition, and monitoring the first group of downlink control channel candidates of the first SS set and the second group of downlink control channel candidates of the second SS set based on the first SS set and the second SS set having a same periodicity but different offsets.

An apparatus for wireless communications at a UE is described. The apparatus may include at least one processor, memory coupled (e.g., operatively, communicatively, functionally, electronically, or electrically) to the at least one processor, the memory storing instructions that may be executable by the at least one processor to cause the apparatus to receive, from a base station, a configuration that indicates a first monitoring pattern for a first SS set within a first transmission time interval and a second monitoring pattern for a second SS set within a second transmission time interval, receive, from the base station, an indication that a first group of downlink control channel candidates in the first SS set are linked with a second group of downlink control channel candidates in the second SS set for downlink control channel repetition, and monitor the first group of downlink control channel candidates of the first SS set and the second group of downlink control channel candidates of the second SS set based on the first SS set and the second SS set having a same periodicity but different offsets.

Another apparatus for wireless communications at a UE is described. The apparatus may include means for receiving, from a base station, a configuration that indicates a first monitoring pattern for a first SS set within a first transmission time interval and a second monitoring pattern for a second SS set within a second transmission time interval, means for receiving, from the base station, an indication that a first group of downlink control channel candidates in the first SS set are linked with a second group of downlink control channel candidates in the second SS set for downlink control channel repetition, and means for monitoring the first group of downlink control channel candidates of the first SS set and the second group of downlink control channel candidates of the second SS set based on the first SS set and the second SS set having a same periodicity but different offsets.

A non-transitory computer-readable medium storing code for wireless communications at a UE is described. The code may include instructions executable by a processor to receive, from a base station, a configuration that indicates a first monitoring pattern for a first SS set within a first transmission time interval and a second monitoring pattern for a second SS set within a second transmission time interval, receive, from the base station, an indication that a first group of downlink control channel candidates in the first SS set are linked with a second group of downlink control channel candidates in the second SS set for downlink control channel repetition, and monitor the first group of downlink control channel candidates of the first SS set and the second group of downlink control channel candidates of the second SS set based on the first SS set and the second SS set having a same periodicity but different offsets.

Some examples of the method, apparatuses, and non-transitory computer-readable medium described herein may further include operations, features, means, or instructions for comparing the first monitoring pattern and the second monitoring pattern to determine whether a set of one or more rules may be satisfied and determining, based on the one or more rules being satisfied, that a first downlink control channel candidate of the first group of downlink control channel candidates may be linked with a second downlink control channel candidate of the second group of downlink control channel candidates.

Some examples of the method, apparatuses, and non-transitory computer-readable medium described herein may further include operations, features, means, or instructions for determining that the one or more rules may be satisfied based at least part on a first slot number of the first transmission time interval, a first frame number associated with the first transmission time interval, a first offset of the first SS set, a second slot number of the second transmission time interval, a second frame number associated with the second transmission time interval, a second offset of the second SS set, or any combination thereof, where the second frame number multiplied by the number of slots per frame plus the second slot number of slots may be greater than the first frame number times the number of slots per frame plus the second slot number, which may be greater than the second frame number multiplied by the number of frames per slot plus the second slot number minus the period of the same periodicity of the first SS set and the second SS set.

Some examples of the method, apparatuses, and non-transitory computer-readable medium described herein may further include operations, features, means, or instructions for ordering the first SS set and the second SS set, where determining that the one or more rules may be satisfied may be based on ordering the first SS set and the second SS set.

Some examples of the method, apparatuses, and non-transitory computer-readable medium described herein may further include operations, features, means, or instructions for receiving, from the base station, an indication that the first SS set may be ordered before the second SS set.

Some examples of the method, apparatuses, and non-transitory computer-readable medium described herein may further include operations, features, means, or instructions for identifying a first index for the first SS set and a second index for the second SS set, where comparing the first monitoring pattern and the second monitoring pattern includes comparing the first index with the second index.

Some examples of the method, apparatuses, and non-transitory computer-readable medium described herein may further include operations, features, means, or instructions for receiving, based on the one or more rules being satisfied, a first repetition of a downlink control message on the first downlink control channel candidate and a second repetition of the downlink control message on the second downlink control channel candidate and combining the first repetition of the downlink control message and the second repetition of the downlink control message.

Some examples of the method, apparatuses, and non-transitory computer-readable medium described herein may further include operations, features, means, or instructions for determining, based on determining whether the one or more rules may be satisfied, that the first transmission time interval may be located prior to the second transmission time interval.

In some examples of the method, apparatuses, and non-transitory computer-readable medium described herein, a duration of the first SS set within a period of the monitoring pattern may be the same as a duration of the second SS set within a period of the monitoring pattern.

In some examples of the method, apparatuses, and non-transitory computer-readable medium described herein, the duration includes the transmission time interval.

In some examples of the method, apparatuses, and non-transitory computer-readable medium described herein, the duration includes a set of consecutive transmission time intervals.

Some examples of the method, apparatuses, and non-transitory computer-readable medium described herein may further include operations, features, means, or instructions for verifying that a number of monitoring occasions of the first monitoring pattern may be the same as a number of monitoring occasions of the second monitoring pattern, determining, based on verifying that the first monitoring pattern and the second monitoring pattern may have the same number of monitoring occasions, that a first monitoring occasion of the first SS set may be linked with a second monitoring occasion of the second SS set, and determining, based on determining the first monitoring occasion may be linked with the second monitoring occasion, that a first downlink control channel candidate of the first group of downlink control channel candidates may be linked with a second downlink control channel candidate of the second group of downlink control channel candidates.

Some examples of the method, apparatuses, and non-transitory computer-readable medium described herein may further include operations, features, means, or instructions for receiving, based on the monitoring, a first repetition of a downlink control message on the first downlink control channel candidate and a second repetition of the downlink control message on the second downlink control channel candidate and combining the first repetition of the downlink control message and the second repetition of the downlink control message.

DETAILED DESCRIPTION

Figure 1:
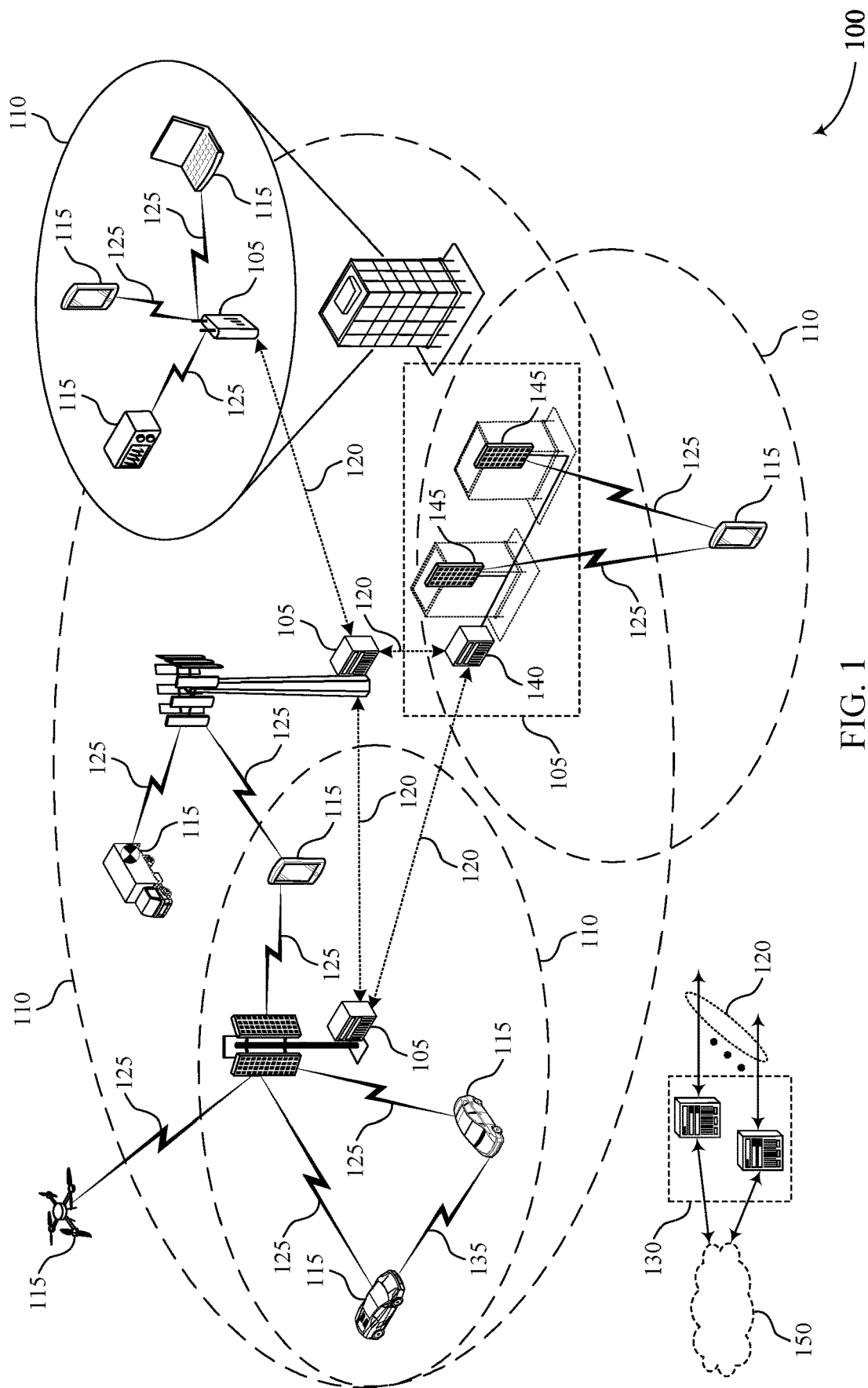
FIG. 1 illustrates an example of a wireless communications system that supports search space (SS) set monitoring for physical downlink control channel (PDCCH) repetition in accordance with aspects of the present disclosure.

Some wireless communications systems may support physical downlink control channel (PDCCH) monitoring, and PDCCH repetitions across different search space (SS) sets. A user equipment (UE) may be configured with PDCCH repetition. In such examples, a base station may transmit control information multiple times across multiple repetitions. PDCCH candidates of a first SS set may be linked with PDCCH candidates of a second SS set. A UE may perform soft combining procedures by combining control signaling received in a first PDCCH candidate in a first SS set with control signaling received in a second SS set. Thus, the UE may monitor a first set of PDDCH candidates (e.g., in the first SS set), a second set of PDCCH candidates (e.g., in the second SS set), and a third set of PDCCH candidates (e.g., by combining the first set of PDCCH candidates with the second set of PDCCH candidates). Each SS set may be defined in terms of a monitoring slot periodicity and an offset, among other parameters (e.g., duration, number of monitoring occasions, or the like). Thus, monitoring occasions of a SS set may be spread across slots in an inter-slot PDCCH repetition scenario, across various symbols of a slot in an intra-slot PDCCH repetition scenario, or both. A UE may benefit from knowing how to determine which monitoring occasions of the first SS set are linked with which monitoring occasions of the second SS set, to successfully monitor linked PDCCH candidates and combine repetitions of control signals.

Techniques for determining whether monitoring occasions of a first SS set are linked to monitoring occasions of a second SS set, when different SS sets are in a same slot or in different slots. For instance, a UE may determine that PDCCH candidates in first and second SS sets are located in the same slot based on a monitoring pattern for SS sets as configured by an RRC parameter (e.g., such as a monitoringSlotPeriodicityAndOffset parameter)). When both SS sets have the same periodicity and the same offset, the UE may determine that SS sets located in a same slot are linked. In some examples, the duration of the monitoring pattern may also be the same. In such examples, the UE may expect the same number of monitoring occasions for each SS set within the slot (e.g., an RRC parameter monitoring SymbolsWithinSlot may be the same for each SS set). The UE may determine that each SS set has the same number of monitoring occasions, and that a monitoring occasion in the first SS set having a first index value is linked with a monitoring occasion in the second SS set that has the same index value.

In some examples, the UE may determine that monitoring occasions for the different SS sets are located in different slots based on the monitoring pattern (e.g., as configured by an RRC parameter such as the monitoringSlotPeriodicityAndOffset for each SS set), where both SS sets have the same periodicity but different offsets. The UE may determine that one or more rules are satisfied, such that the first PDCCH repetition in the first SS set is always located in an earlier slot than the second PDDCH repetition in the second SS set. In such examples, the UE may determine that a monitoring occasion in the first SS set having a first index value is linked with a monitoring occasion in the second SS set that has the same index value.

Aspects of the disclosure are initially described in the context of wireless communications systems and timelines. Aspects of the disclosure are further illustrated by and described with reference to apparatus diagrams, system diagrams, and flowcharts that relate to SS set monitoring for PDCCH repetition.

FIG. 1 illustrates an example of a wireless communications system 100 that supports SS set monitoring for PDCCH repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more SS sets, and each SS set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. SS sets may include common SS sets configured for sending control information to multiple UEs 115 and UE-specific SS sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques for determining whether monitoring occasions of a first SS set are linked to monitoring occasions of a second SS set, when different SS sets are in a same slot or in different slots. For instance, a UE 115 may determine that PDCCH candidates in first and second SS sets are located in the same slot based on a monitoring pattern for SS sets as configured by an RRC parameter (e.g., such as a monitoringSlotPeriodicityAndOffset parameter)). When both SS sets have the same periodicity and the same offset, the UE 115 may determine that SS sets located in a same slot are linked. In some examples, the duration of the monitoring pattern may also be the same. In such examples, the UE 115 may expect the same number of monitoring occasions for each SS set within the slot (e.g., an RRC parameter monitoring symbolsWithinSlot may be the same for each SS set). The UE 115 may determine that each SS set has the same number of monitoring occasions, and that a monitoring occasion in the first SS set having a first index value is linked with a monitoring occasion in the second SS set that has the same index value.

In some aspects, a UE 115 of the wireless communications system 100 may be configured with up to three CORESETS within a given BWP. A CORESET may include one or more transmission configuration indicator (TCI) states for PDCCH repetition, and may be associated with a quantity of resource blocks (RBs) in the frequency domain, and a quantity of symbols or other TTI in the time domain (e.g., quantity of OFDM symbols). In some aspects, a CORESET configured at the UE 115 may be associated with a CCE resource element group (CCE-REG) mapping type (e.g., CCE-REG bundle mapping type), a precoding granularity, an identifier (e.g., scrambling identifier) associated with scrambling for PDCCH demodulation reference signals (DMRS), coded bits of downlink control information (DCI) content, or any combination thereof.

In some aspects, a UE 115 may be configured with up to ten SS sets within a given BWP. In some aspects, each SS set may be associated with a given CORESET, and may include a set of monitoring occasions. In some aspects, a SS set may include a set of control channel monitoring occasions (e.g., PDCCH monitoring occasions). Moreover, a UE 115 may be configured to determine the control channel monitoring occasions associated with a given SS set based on one or more characteristics of the SS set which may be configured (e.g., pre-configured) at the UE 115, indicated to the UE 115 via a base station 105, or both. A UE 115 may be configured with one or more different types of SS sets (e.g., searchSpaceType), including UE-specific SS sets, common SS sets, or both. Additionally, each SS set may be associated with one or more DCI formats which are to be monitored.

Parameters of a SS set (s) may include a periodicity ($k_s$) of monitoring occasions (e.g., $k_s$ slots), an offset ($o_s$) for monitoring occasions in units of slots (e.g., $o_s$ slots) (e.g., monitoringSlotPeriodicityAndOffset), a duration ($T_s$) indicative of a quantity of slots within a period in which the SS set exists (where $T_s < k_s$), or any combination thereof. A UE 115 of the wireless communications system 100 may determine a quantity of PDCCH monitoring occasions within a slot $\eta_{s,f}^\mu$ and a frame $\eta_f$ if $\eta_f N_{slot}^{frame,\mu} + \eta_{s,f}^\mu o_s$ modk$_s$=0. In some aspects, when monitoring a control channel, a UE 115 may be configured to monitor control channel candidates (e.g., PDCCH candidates) for a SS set s for T$_s$ consecutive slots, starting from slot $\eta_{s,f}^\mu$, and may refrain from monitoring control channel candidates for the SS set s for the next k$_s$-T$_s$ consecutive slots. Quantities of control channel candidates (e.g., PDCCH candidates) may be based on an aggregation level (e.g., quantity of CCEs) of wireless communications at the UE 115.

In some aspects, a UE 115 may be configured to monitor a control channel according to a control channel monitoring pattern (e.g., PDCCH monitoring pattern) within a slot (e.g., monitoringSymbolsWithinSlot). For example, a PDCCH monitoring pattern within a slot may indicate a first symbol(s) of a CORESET within a slot for PDCCH monitoring. For instance, in the context of a slot including fourteen symbols, a CORESET configured at a UE 115 may associated with a SS set including three symbols, and a control channel monitoring pattern (e.g., monitoringSymbolsWithinSlot) associated with the SS set may be configured as "01000010001000." In this example, the UE 115 may be configured to determine that there are three monitoring occasions within each slot that the SS set exists. Moreover, the UE 115 may be configured to determine that the three monitoring occasions begin at the second, seventh, and eleventh symbols of each respective slot that the SS exists.

In the context of a SFN, SFN PDCCH transmissions (e.g., PDCCH DMRS) may be associated with two TCI states. In particular, for SFN PDCCH transmissions, one CORESET may be activated at UE 115 with two active TCI states. In such cases, each control channel candidate (e.g., PDCCH candidate) of a SS set associated with the CORESET may be associated with the two active TCI states of the CORESET.

Similarly, for PDCCH repetitions in which each PDCCH repetition includes a PDCCH candidate, two PDCCH candidates (e.g., two PDCCH repetitions) may be linked (e.g., related) together for possible repetitions of the same control channel transmission (e.g., repetitions of DCI). In the context of PDCCH repetitions, the payload (e.g., DCI payload) of the two PDCCH candidates (e.g., two PDCCH repetitions) may be the same. For example, a first PDCCH candidate may be related, or linked, to a second PDCCH candidate. In this example, a first repetition of DCI may be transmitted in the first PDCCH candidate, and a second repetition of DCI may be transmitted in the second PDCCH candidate, where the first and second repetitions of DCI are the same. In this example, a UE 115 may receive and/or decode only the first repetition of DCI or only the second repetition of DCI. Additionally, or alternatively, the UE 115 may receive and/or decode both the first and second repetitions of DCI by performing soft combining of the first and second repetitions of DCI. In some aspects, related/linked PDCCH candidates may have the same aggregation level (e.g., same quantities of CCEs).

In some aspects related PDCCH candidates in different SS sets which are associated with corresponding CORESETs may be linked together (e.g., related) for PDCCH repetition. In some cases, two PDCCH candidates with a same candidate index across two related SS sets may be linked or related. In other cases, PDCCH candidates with a same start CCE index may be linked. In some aspects, sets of related/linked PDCCH candidates may be configured via control signaling (e.g., RRC signaling). For example, a UE 115 may receive an RRC message which indicates that a first PDCCH candidate in a first SS set is linked with (e.g., related to) a second PDCCH candidate in a second SS set. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

In some examples, the UE 115 may determine that monitoring occasions for the different SS sets are located in different slots based on the monitoring pattern (e.g., as configured by an RRC parameter such as the monitoringSlotPeriodicityAndOffset for each SS set), where both SS sets have the same periodicity but different offsets. The UE 115 may determine that one or more rules are satisfied, such that the first PDCCH repetition in the first SS set is always located in an earlier slot than the second PDDCH repetition in the second SS set. In such examples, the UE 115 may determine that a monitoring occasion in the first SS set having a first index value is linked with a monitoring occasion in the second SS set that has the same index value.

Figure 2:
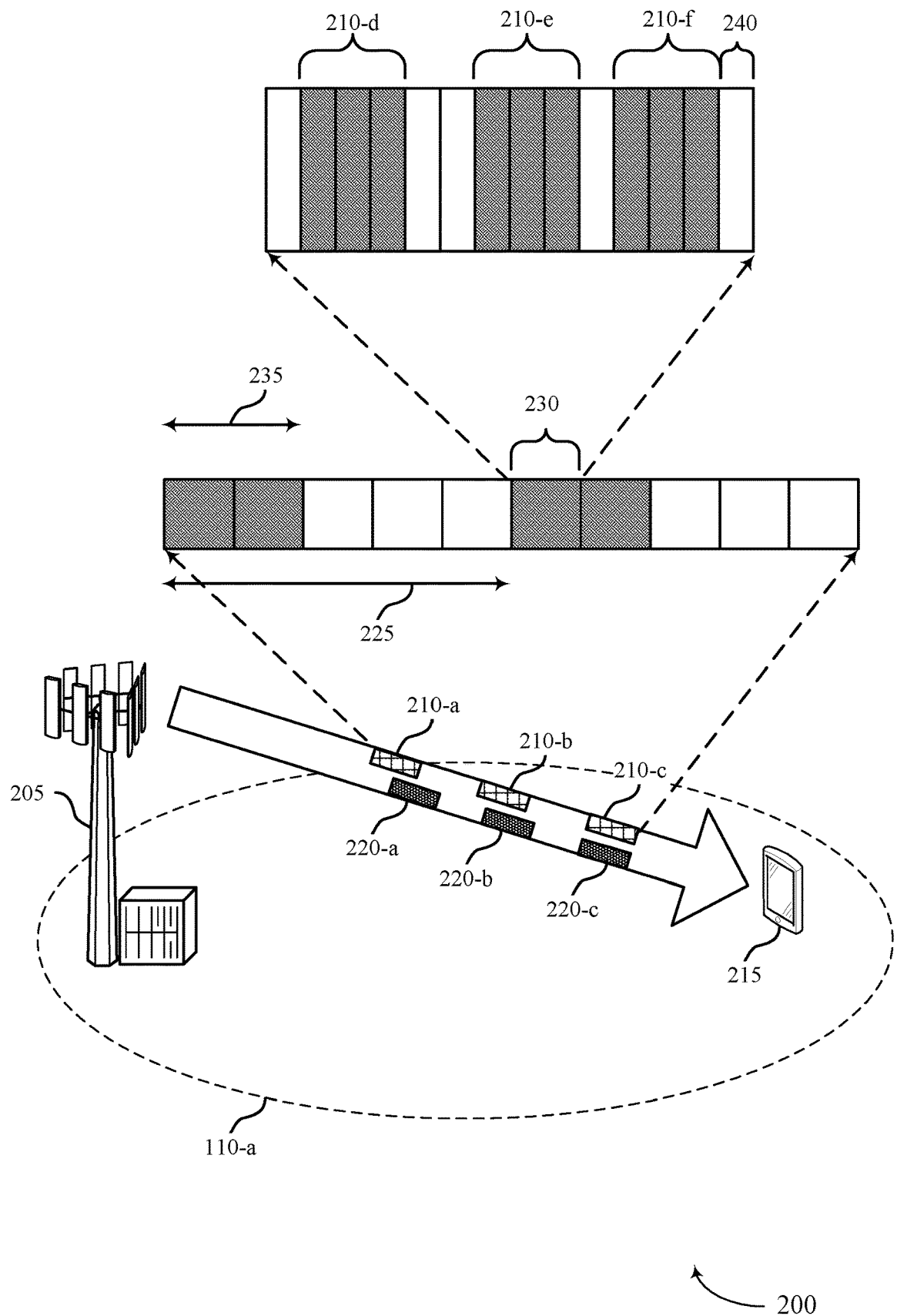
FIG. 2 illustrates an example of a wireless communications system that supports SS set monitoring for PDCCH repetition in accordance with aspects of the present disclosure.

FIG. 2 illustrates an example of a wireless communications system 200 that supports SS set monitoring for PDCCH repetition in accordance with aspects of the present disclosure. The wireless communications system may implement aspects of wireless communications system 100. For example, wireless communications system 200 may include a base station 205 and a UE 215, which may be examples of corresponding devices described with reference to FIG. 1. Base station 205 may serve one or more UEs 215 located within a coverage area 110-*a*.

In some aspects, UE 215 may be configured with one or more CORESETs in a BWP of a serving cell. For example, UE 215 may be configured with three, five, or some other number of CORESETs in a BWP configured by base station 205. Generally, each CORESET may be associated with one active transmission configuration indicator (TCI) state. For example, as part of the configuration of the CORESET for UE 215 by base station 205, the number of resource blocks (RBs) of the CORESET in the frequency domain and the number of symbols of the CORESET in the time domain (e.g., one, two, or three OFDM symbols) may be RRC configured for UE 215.

In some examples, wireless communications system 200 may support PDCCH monitoring in one or more SS sets. In some aspects, each SS set may be associated with one CORESET. There may be, for instance, up to ten SS sets in a BWP of a component carrier (CC). As part of the SS set configuration, RRC signaling may be used to configure the associated CORESET, the periodicity and offset of the monitored slots and the symbols to be monitored within the slot in the time domain, the DCI formats to be monitored, or the number of PDCCH candidates for a given aggregation level (AL). The PDCCH candidates may be defined as part of a SS set configuration. For example, the PDCCH candidate with a given AL in a given PDCCH candidate index may be defined in a given SS set. A DCI may be conveyed in one PDCCH candidate. For example, base station 205 may configure a first SS set including multiple PDCCH monitoring occasions 210 (e.g., monitoring occasion 210-*a*, monitoring occasion 210-*b*, and monitoring occasion 210-*c*), and a second SS set including multiple PDCCH monitoring occasions 220 (e.g., monitoring occasion 220-*a*, monitoring occasion 220-*b*, and monitoring occasion 220-*c*). Each monitoring occasion may be configured with one or more PDCCH candidates (e.g., PDCCH candidates included in a monitoring occasion 210, PDCCH candidates included in a monitoring occasion 220, or the like).

In some examples, each SS set (e.g., the first SS set including monitoring occasions 210) may be defined by one or more parameters. For example, the first SS set may correspond to a CORESET, and one or more PDCCH monitoring occasions 210. Parameters of a SS set (s) may include a periodicity ($k_s$) of monitoring occasions (e.g., $k_s$ slots), an offset ($o_s$) for monitoring occasions in units of slots (e.g., $o_s$ slots). For example, the first SS set s=1 may have a periodicity ($k_1$) 225 of 5 slots 230, and an offset ($o_1$) of 0 slots 230. Base station 205 may configure the SS set periodicity and offset via an RRC message (e.g., monitoringSlotPeriodicityAndOffset). The SS set may be further defined by a duration ($T_s$) indicative of a quantity of slots within a period in which the SS set exists (where $T_s<k_s$). For instance, the first SS set s=1 may have a duration ($T_1$) 235 of 2 slots 230. In some examples, base station 205 may configure UE 215 to monitor for control signaling in a SS set by indicating a PDCCH monitoring pattern with a TTI (e.g., slot 230). For instance, an RRC parameter (e.g., monitoringSymbolsWithinSlot) may indicate a first symbol of the CORESET in a slot 230 for monitoring. For instance, for a CORESET having 3 symbols 240, the RRC parameter may indicate a first symbol (e.g., symbol 2 of a slot 230), a second symbol (e.g., a seventh symbol of a slot 230), and a third symbol (e.g., an eleventh symbol of a slot 230). The first indicated symbol may be the first symbol of a first monitoring occasion 210-d in the slot 230, the second symbol may be the first symbol of a second monitoring occasion 210-e in the slot 230, and the third symbol may be the first symbol of a third monitoring occasion 210-f. A bitmap indicating such a configuration of slot 230 may be configured as "01000010001000".

UE 215 may monitor PDCCH candidates in various SS sets to receive one or more DCI messages. UE 215 may determine that PDCCH candidates have passed a cyclic redundancy check (CRC) check (e.g., UE 215 may attempt to blindly decode each PDCCH candidate, with a blind decoding attempt where the PDCCH candidate passes the CRC check corresponding to a successfully decoded DCI). In some wireless communication systems there may be a limit (e.g., a maximum number) of monitored PDCCH candidates that UE 215 can attempt to blindly decode (e.g., a blind decode limit, which may be also referred to as a maximum blind decode count, a BD limit, a monitored PDCCH candidate limit, or the like). The blind decode limit (BD limit) may be based on a given transmission time interval (e.g., a slot, span, or other duration in the time domain). Thus, in any given TTI, a UE may be configured with one or more PDCCH candidates. The PDCCH candidates may correspond to different SS sets. The UE may count some or all of the PDCCH candidates toward the BD limit.

Some wireless communication systems may enable a PDCCH transmission with two active TCI states. Variations of this approach may include one CORESET with two active TCI states, one SS set associated with two different CORESETS, or two SS sets associated with corresponding CORESETs. In the situation where one CORESET is associated with two active TCI states, base station 205 may configure one PDCCH candidate (in a given SS set) to be associated with both TCI states of the CORESET. In another approach where one CORESET may be associated with two active TCI states, base station 205 may configure two sets of PDCCH candidates (in a given SS set) to be associated with the two active TCI states of the CORESET, respectively. In yet another approach where one CORESET may be associated with two active TCI states, base station 205 may configure two sets of PDCCH candidates to be associated with two corresponding SS sets, where both SS sets are associated with the CORESET and each SS set is associated with only one TCI state of the CORESET. Generally, a set of PDCCH candidates may include a single or multiple PDCCH candidates, and the PDCCH candidate in a set corresponds to a repetition or chance in which the DCI may be indicated to UE 215.

Sets of PDCCH candidates in various SS sets may provide repetition-based PDCCH candidates where each PDCCH candidate is linked to the other PDCCH candidates. For example, a PDCCH candidate of the first SS set may be located in monitoring occasion 210-a, and may be linked to a PDCCH candidate located in monitoring occasion 220-a of the second SS set. A PDCCH candidate of a first SS set and PDCCH candidate of a second SS set may be located in the same slot, or in different slots. In some examples, base station 205 may transmit DCI messages using PDCCH repetition over the two linked PDCCH candidates. For instance, base station 205 may transmit a first repetition of the DCI message on a PDCCH candidate in the first SS set, and a second repetition of the DCI message on a PDCCH candidate in the second SS set. In some examples, UE 215 may perform a soft combining procedure on PDCCH candidates received in the first and second SS set, resulting in soft combined PDCCH candidate. The UE may consider soft combined PDCCH candidate as an additionally monitored PDCCH candidate.

In some examples, two or more PDCCH candidates may be explicitly linked together (e.g., base station 205 may configure the linkage to UE 215 before UE 215 attempts to perform blind decoding of the PDCCH candidates). In some examples, two or more PDCCH candidates may not be explicitly linked together, the UE 215 may identify or otherwise determine the linkage after or before decoding. However, some wireless communication systems do not provide a mechanism or other indication of how the one or more PDCCH candidates are counted for when the monitoring is applied to the blind decoding limit configured for UE 215.

Thus, as described herein, monitoring occasions for different SS sets may depend on SS set configurations, including period, offset, duration, and monitoring occasions within slots (e.g., as indicated in various RRC parameters such as monitoringSlotPeriodicityAndOffset, Duration, and monitoringSmbolsWithinSlot for respective SS sets). For PDCCH repetition, when two linked PDCCH candidates are in different SS sets, the monitoring occasions of the two SS sets may also be linked, because linked PDCCH candidates are defined in given monitoring occasions of a given SS set. Thus, A UE 215 may need to determine which monitoring occasions of a first SS set are linked to which monitoring occasions of a second SS set. In some examples, UE 215 may identify whether monitoring occasions in different SS sets in the same TTI (e.g., slot) are linked, as described in greater detail with reference to FIG. 3. In some examples, UE 215 may identify whether monitoring occasions in different SS sets in different TTIs (e.g., slots) are linked, as described in greater detail with reference to FIGS. 4-6.

Figure 3:
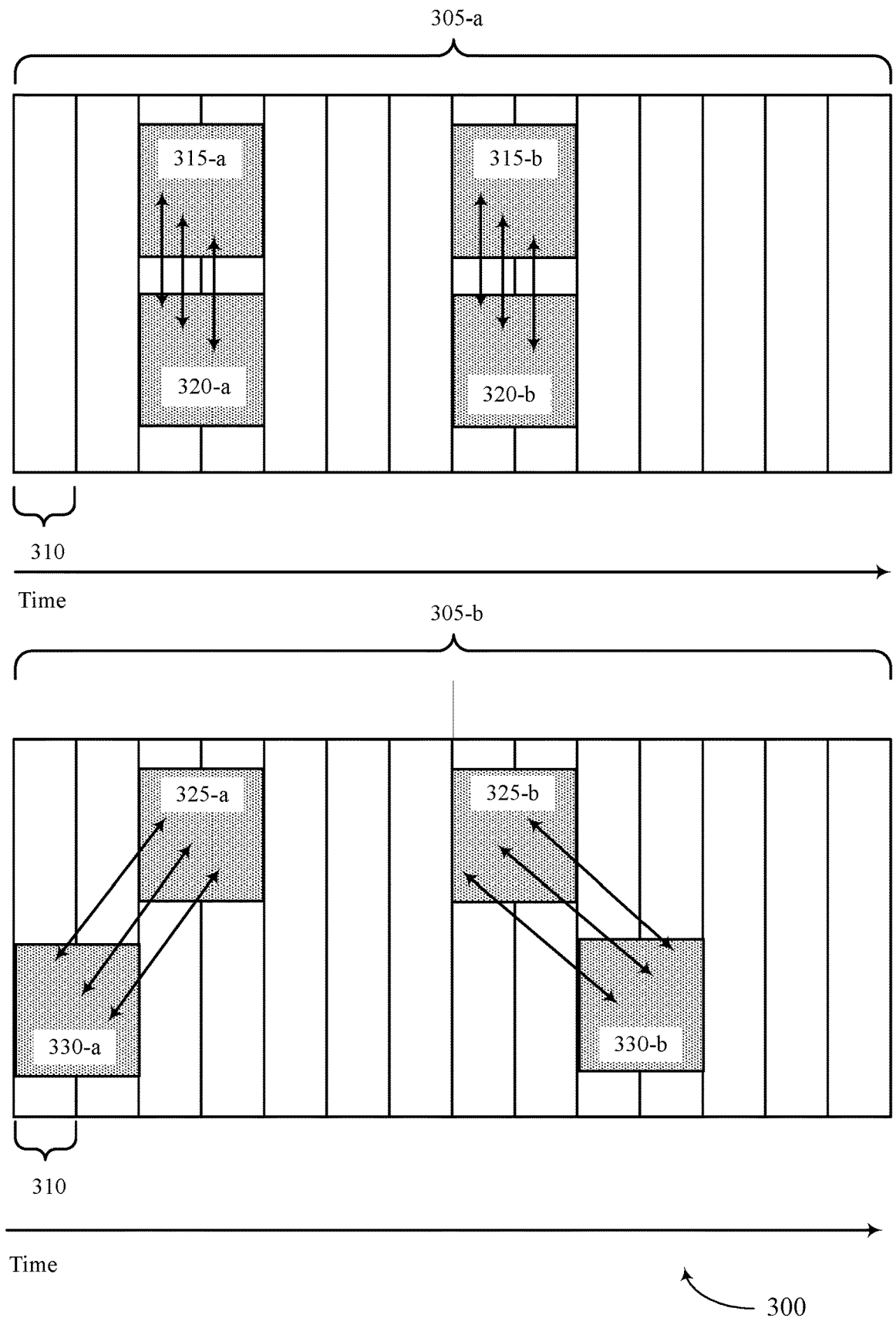
FIG. 3 illustrates an example of a timeline that supports SS set monitoring for PDCCH repetition in accordance with aspects of the present disclosure.

FIG. 3 illustrates an example of a timeline 300 that supports SS set monitoring for PDCCH repetition in accordance with aspects of the present disclosure. Timeline 300 may implement aspects of wireless communication system 100 and wireless communications system 200. For example, a base station and a UE may communicate according to timeline 300, and the base station and UE may be examples of corresponding devices described with reference to FIGS. 1 and 2.

In some examples, a base station may configure a UE with multiple SS sets (e.g., an indication of two SS set indices for a first SS set and a second SS set) within a same TTI (e.g., slot 305). The base station may configure a first monitoring occasion 315-*a* and second monitoring occasion 315-*b* of a first SS set, and may also configure first monitoring occasion 320-*a* and second monitoring occasion 320-*b* of a second SS set. The UE may expect both SS sets to be configured with the same periodicity and the same offset (e.g., the same values for monitoringSlotPeriodicityAndOffset). The first and second SS sets may further have the same duration. Having the same periodicity, offset, duration, or any combination thereof, may result in intra-slot PDCCH repetition.

In some examples, the UE may expect a same number of monitoring occasions within slot 305-*a* for both SS sets. For instance, the UE may verify that a same number of is exist in an RRC indication (e.g., monitoringSymbolsWithinSlot) for the first SS set as exist in an RRC indication (e.g., monitoringSymbolsWithinSlot) for the second SS set. In such examples, the UE may determine that monitoring occasions having the same index values (f) in the two SS sets are linked. For example, the first SS set may be configured with an RRC parameter monitoringSymbolsWithinSlot including two is (e.g., a bitmap 00100001000000), which may indicate that monitoring occasion 315-*a* (e.g., associated with a CORESET having 2 symbols) starts during a third symbol 310 of slot 305-*a* and that monitoring occasion 315-*b* starts during a eighth symbol 310 of slot 305-*a*. The second SS set may be configured with an RRC parameter monitoringSymbolsWithinSlot including two is (a bitmap 00100001000000), which may indicate that monitoring occasion 320-*a* (e.g., associated with a CORESET having 2 symbols) starts during a third symbol 310 of slot 305-*a* and that monitoring occasion 320-*b* starts during a eighth symbol 310 of slot 305-*a*. Because both bitmaps include the same number of 1s, indicating a same number of monitoring occasions, the UE may verify that the same number of monitoring occasions exist within slot 305-*a*. Thus, the UE may determine that monitoring occasion 315-*a* of the first SS set is linked with monitoring occasion 320-*a* of the second SS set (e.g., the first monitoring occasion of each SS set having the same index value) and may determine that monitoring occasion 315-*b* of the first SS set is linked with monitoring occasion 320-*b* of the second SS set (e.g., the second monitoring occasion of each SS set having the same index value). Individual PDCCH candidates in linked monitoring occasions may be linked with each other for PDCCH repetition.

Similarly, even where TTI boundaries (e.g., symbol boundaries) of monitoring occasions are not aligned, the UE may determine that monitoring occasions of different SS sets are linked based on verifying a number of monitoring occasions within a TTI. For instance, in slot 305-*b*, the UE may verify that a same number of is exist in an RRC indication (e.g., monitoringSymbolsWithinSlot) for the first SS set as exist in an RRC indication (e.g., monitoringSymbolsWithinSlot) for the second SS set. The first SS set may be configured with an RRC parameter monitoringSymbolsWithinSlot including two is (e.g., a bitmap 00100001000000), which may indicate that monitoring occasion 325-*a* (e.g., associated with a CORESET having 2 symbols) starts during a third symbol 310 of slot 305-*a* and that monitoring occasion 325-*b* starts during a eighth symbol 310 of slot 305-*b*. The second SS set may be configured with an RRC parameter monitoringSymbolsWithinSlot including two is (a bitmap 10000000010000), which may indicate that monitoring occasion 330-*a* (e.g., associated with a CORE-SET having 2 symbols) starts during a first symbol 310 of slot 305-*b* and that monitoring occasion 330-*b* starts during a tenth symbol 310 of slot 305-*b*. Because both bitmaps include the same number of 1s, indicating a same number of monitoring occasions, the UE may verify that the same number of monitoring occasions exist within slot 305-*b*. Thus, the UE may determine that monitoring occasion 325-*a* of the first SS set is linked with monitoring occasion 330-*a* of the second SS set (e.g., the first monitoring occasion of each SS set having the same index value) and may determine that monitoring occasion 325-*b* of the first SS set is linked with monitoring occasion 330-*b* of the second SS set (e.g., the second monitoring occasion of each SS set having the same index value). Individual PDCCH candidates in linked monitoring occasions may be linked with each other for PDCCH repetition.

Thus, in a slot 305 where two SS sets exist, the $j^{th}$ monitoring occasion of the first SS set may be linked with the $j^{th}$ monitoring occasion of the second SS set. A first repetition of a control message (e.g. DCI message) may be received in a first PDCCH candidate in the first monitoring occasion (e.g., monitoring occasion 325-*a*) of the first SS set, and a second repetition of a control message (e.g., DCI message) may be received in a first PDCCH candidates (e.g., that is linked with the first PDDCH candidate in monitoring occasion 325-*a*) in the first monitoring occasion (e.g., monitoring occasion 330-*a*) of the second SS set. The UE may soft combine the DCI received in the first PDCCH candidate in the first SS set with the DCI received in the first PDDCH candidates win the second SS set.

In some examples, a UE may determine which monitoring occasions of different SS sets, that are located in different TTIs, are linked, as described in greater detail with reference to FIGS. 4-6.

Figure 4:
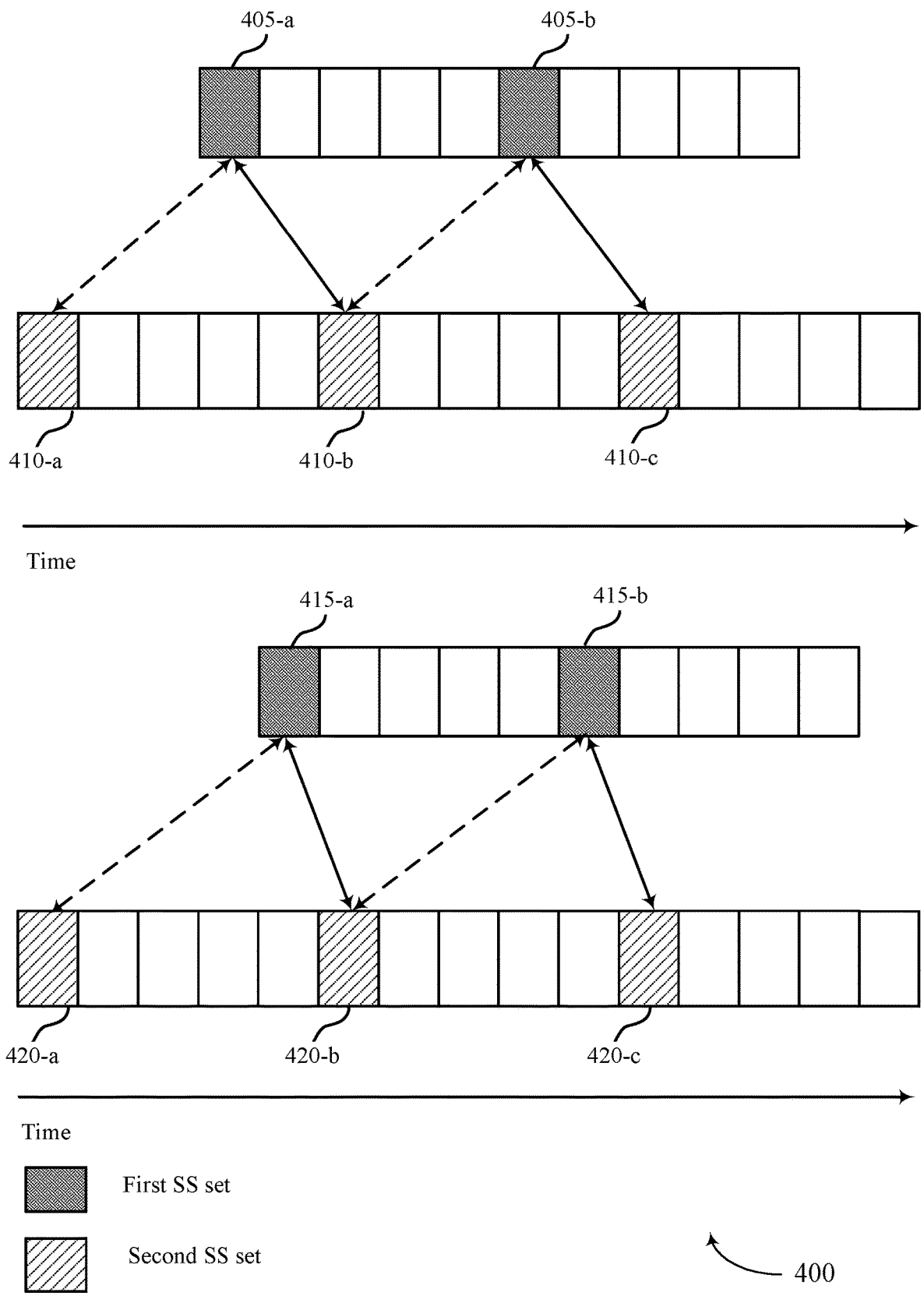
FIG. 4 illustrates an example of a timeline that supports SS set monitoring for PDCCH repetition in accordance with aspects of the present disclosure.

FIG. 4 illustrates an example of a timeline 400 that supports SS set monitoring for PDCCH repetition in accordance with aspects of the present disclosure. Timeline 400 may implement aspects of wireless communication system 100 and wireless communications system 200. For example, a base station and a UE may communicate according to timeline 400, and the base station and UE may be examples of corresponding devices described with reference to FIGS. 1 and 2.

In some examples, the base station may configure the UE with a first SS set, and a second SS set. The first and second SS sets may have the same periodicity $k_s$, but may have different offset values (e.g., $o_{s,1}$ for the first SS set and $o_{s,2}$ for the second SS set). If the UE may support inter-slot PDCCH repetition in consecutive slots, then the base station may configure the offsets of the two SS sets such that periodicity and two offset values $(o_{s,2}-o_{s,1}) \bmod k_s=1$.

A base station may configure a UE with a pair of SS set indices for inter-slot PDCCH repetition. The UE may expect that the two SSS sets be configured with the same periodicity that is larger than one slot (e.g., $k_s > 1$), but having different offsets (e.g., $o_{s,1}$ and $o_{s,2}$, respectively). In such examples, a first slot including a monitoring occasion for the first SS set (e.g., a first slot with a slot number $n_{s,f,1}^\mu$ with a SCS scheme $\mu$ in a frame with a frame number $n_{f,1}$, with a number of slots per frame $N_{slot}^{frame,\mu}$, such that $(n_{f,1} \cdot N_{slot}^{frame,\mu} + n_{s,f,1}^\mu - o_{s,1}) \bmod k_s = 0$) may be linked with a second slot including a monitoring occasion for the second SS set (e.g., a slot having a slot number $n_{s,f,2}^\mu$ and a frame number $n_{f,2}$) if one or more rules or conditions are satisfied.

The UE may determine that one or more rules are satisfied such that a first PDCCH repetition in the first SS set is located earlier in time (e.g., in an earlier TTI) than a second PDCCH repetition in the second SS set. For instance, the UE may verify that a first condition is satisfied, where $(n_{f,2} \cdot N_{slot}^{frame,\mu} + n_{s,f,2}^{\mu} - o_{s,2}) \bmod k_s = 0$ if $n_{f,2} \cdot N_{slot}^{frame,\mu} + n_{s,f,2}^{\mu} > n_{f,1} \cdot N_{slot}^{frame,\mu} + n_{s,f,1}^{\mu} > n_{f,2} \cdot N_{slot}^{frame,\mu} + n_{s,f,2}^{\mu} - k_s$. In some examples, the UE may verify that a second condition is satisfied, where $n_{f,2} \cdot N_{slot}^{frame,\mu} + n_{s,f,2}^{\mu} - (n_{f,1} \cdot N_{slot}^{frame,\mu} + n_{s,f,1}^{\mu}) = (o_{s,2} - o_{s,1}) \bmod k_s$. The UE may apply one of these conditions, both of these conditions, or additional conditions. Verifying that such conditions or rules are satisfied may result in a first repetition of a first SS set being located prior to a second repetition of a second SS set.

For example, the base station may configure the UE with a first SS set s=1 and a second SS set s=2, where $k_s=5$, $o_{s,1}=1$, $o_{s,2}=3$, and assuming a SCS of 30 KHz and a number of slots per frame $N_{slot}^{frame,\mu}=20$. A slot 405-a may include a monitoring occasion of the first SS set, and may have a slot number of 16. Thus, $n_{f,1} \cdot N_{slot}^{frame,\mu} + n_{s,f,1}^{\mu} = 1 \times 20 + 16 = 36$. A slot 410-b located two slots later than slot 405-a may include a monitoring occasion of the second SS set, and may have a slot number 18. Thus, $n_{f,2} \cdot N_{slot}^{frame,\mu} + n_{s,f,2}^{\mu} = 1*20 + 18 = 38$. The UE may determine that monitoring occasions of the first SS set located in slot 405-a are linked with monitoring occasions of the second SS set located in slot 410-b, and that similarly monitoring occasions in slot 405-b are linked with monitoring occasions in slot 410-c. By applying the one or more conditions described herein, the UE may ensure that the first repetition of a DCI message is located earlier in time than the second repetitions of the DCI message (e.g., slot 405-a carrying the first repetition is linked with slot 410-b carrying the second repetition, as opposed to slot 410-a carrying the second repetition earlier than slot 405-a.

In some examples, the base station may configure the UE with a first SS set s=1 and a second SS set s=2, where $k_s=5$, $o_{s,1}=4$, $o_{s,2}=0$, and assuming a SCS of 30 KHz and a number of slots per frame $N_{slot}^{frame,\mu}=20$. A slot 415-a may include a monitoring occasion of the first SS set, and may have a slot number of 19. Thus, $n_{f,1} \cdot N_{slot}^{frame,\mu} + n_{s,f,1}^{\mu} = 1*20 + 19 = 39$. A slot 420-b located one slot later than slot 415-a may include a monitoring occasion of the second SS set, and may have a slot number 0 (e.g., a first slot of a next frame). Thus, $n_{f,2} \cdot N_{slot}^{frame,\mu} + n_{s,f,2}^{\mu} = 2*20 + 0 = 40$. The UE may determine that monitoring occasions of the first SS set located in slot 415-a are linked with monitoring occasions of the second SS set located in slot 420-b. By applying the one or more conditions described herein, the UE may ensure that the first repetition of a DCI message is located earlier in time than the second repetition of the DIC message (e.g. slot 415-a carrying the first repetition is linked with slot 420-b carrying the second repetition, as opposed to slot 420-a carrying the second repetition earlier than slot 415-a). This pattern may be repeated for subsequent slots. For example the UE may determine that monitoring occasions of the first SS set located in slot 415-b are linked with monitoring occasions of the second SS set located in slot 420-c.

In some examples, determining an order of SS sets may impact application of the conditions or determining linking between monitoring occasions, or both. For example, the second SS set may be ordered before the first SS set, such that monitoring occasions in the second SS set carry the first repetition of a PDCCH message and monitoring occasions of the second SS set carry the second repetition of the DCI message. In such examples, the UE may verify that the one or more rules are satisfied, and may determine that, for instance, slot 410-a of the second SS set is linked to slot 405-a, slot 410-b is linked to slot 405-b.

In some examples, the UE may determine which of two SS sets is ordered or prioritized before the other. For instance, the UE may order the two SS sets based on a configuration by the base station. In such examples, the base station may transmit, to the UE, a configuration message indicating that, for example, the first SS set is ordered first (e.g., prioritized as a first SS set) and the second SS set is ordered second. The configuration message may indicate that a first SS set with index value of 4 and a second SS set with an index value of 2 are linked, and may further indicate that the first SS set (e.g., the index value 4) is ordered before the second SS set(e.g., the index value 2). In some examples, the UE may implicitly determine the ordering of the linked SS sets. For example, the UE may determine which SS set has a higher or lower index value (e.g., according to one or more preconfigured, standardized, or configured rules). In such examples, where a first SS set with index value of 4 and a second SS set with an index value of 2 are linked, the UE may determine that the SS set with the smaller index value (e.g., the second SS set with index value 2) may be ordered over the first SS set (e.g., having a larger index value of 4). If the order of SS sets changes, then the linked slots for PDCCH repetition may change, as described herein.

Inter-slot repetition in the case of consecutive slots is described in greater detail with reference to FIG. 5.

Figure 5:
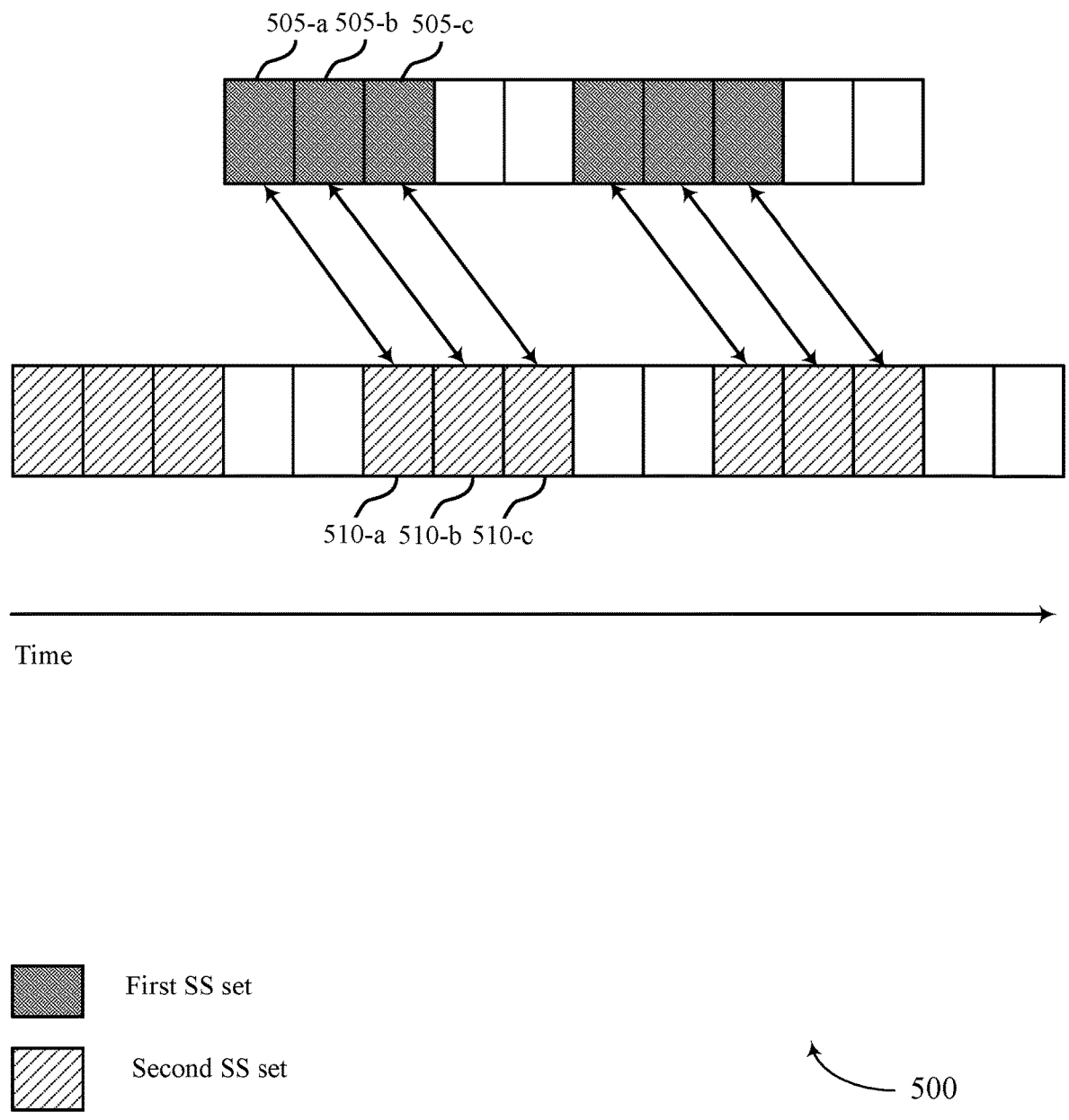
FIG. 5 illustrates an example of a timeline that supports SS set monitoring for PDCCH repetition in accordance with aspects of the present disclosure.

FIG. 5 illustrates an example of a timeline 500 that supports SS set monitoring for PDCCH repetition in accordance with aspects of the present disclosure. Timeline 500 may implement aspects of wireless communication system 100 and wireless communications system 200. For example, a base station and a UE may communicate according to timeline 500, and the base station and UE may be examples of corresponding devices described with reference to FIGS. 1 and 2.

In some examples, with respect to the duration of the SS sets, the UE may expect that an SS set exists only in one slot within the period (e.g., both SS sets are configured with a duration $T_s=1$), or the base station may not configure a value and the UE may assume a duration of one slot. For instance, durations of one slot (whether configured or assumed), are illustrated and described with reference to FIG. 4.

In some examples, the duration may be longer than 1 slot, but may be the same for each SS set, as described with reference to FIG. 5. For instance, the first SS set may have a duration of $T_s=3$. In such examples, the UE may determine a link between the first slot of a period of the SS set and a first slot of a period of the second SS set, and may assume that the remaining slots of those durations are mapped 1:1. For instance, slot 505-a may be the first slot of a $T_s=3$ where $k_s=5$. Slot 505-a may include a monitoring occasion for the first SS set and slot 510-a may include a monitoring occasion for the second SS set. Slot 505-a may have a slot number 16, so $n_{f,1} \cdot N_{slot}^{frame,\mu} + n_{s,f,1}^{\mu} = 1*20 + 16 = 36$. Slot 510-a may have a slot number 18 (e.g., in the same frame), so $n_{f,2} \cdot N_{slot}^{frame,\mu} + n_{s,f,2}^{\mu} = 1*20 + 18 = 38$. Thus, by applying the one or more rules described with reference to FIG. 4, the UE may determine that slot 505-a is linked with slot 510-a, and individual PDCCH candidates of a monitoring period of the first SS set in slot 505-a are linked with corresponding PDCCH candidates of a monitoring period of the second SS set in slot 510-a. Then, given the duration of $T_s=3$, the UE may determine that the second slot 505-b of the same duration is linked with the second slot 510-b, and the third slot 505-c of the same duration is linked with the third slot 510-c.

In some examples, a UE may be configured for consecutive inter-slot repetition, and may be configured with offset values such that $(o_{s,2} - o_{s,1}) \bmod k_s = 1$.

In some examples, there may be multiple monitoring occasions within linked slots, as described in greater detail with reference to FIG. 6.

Figure 6:
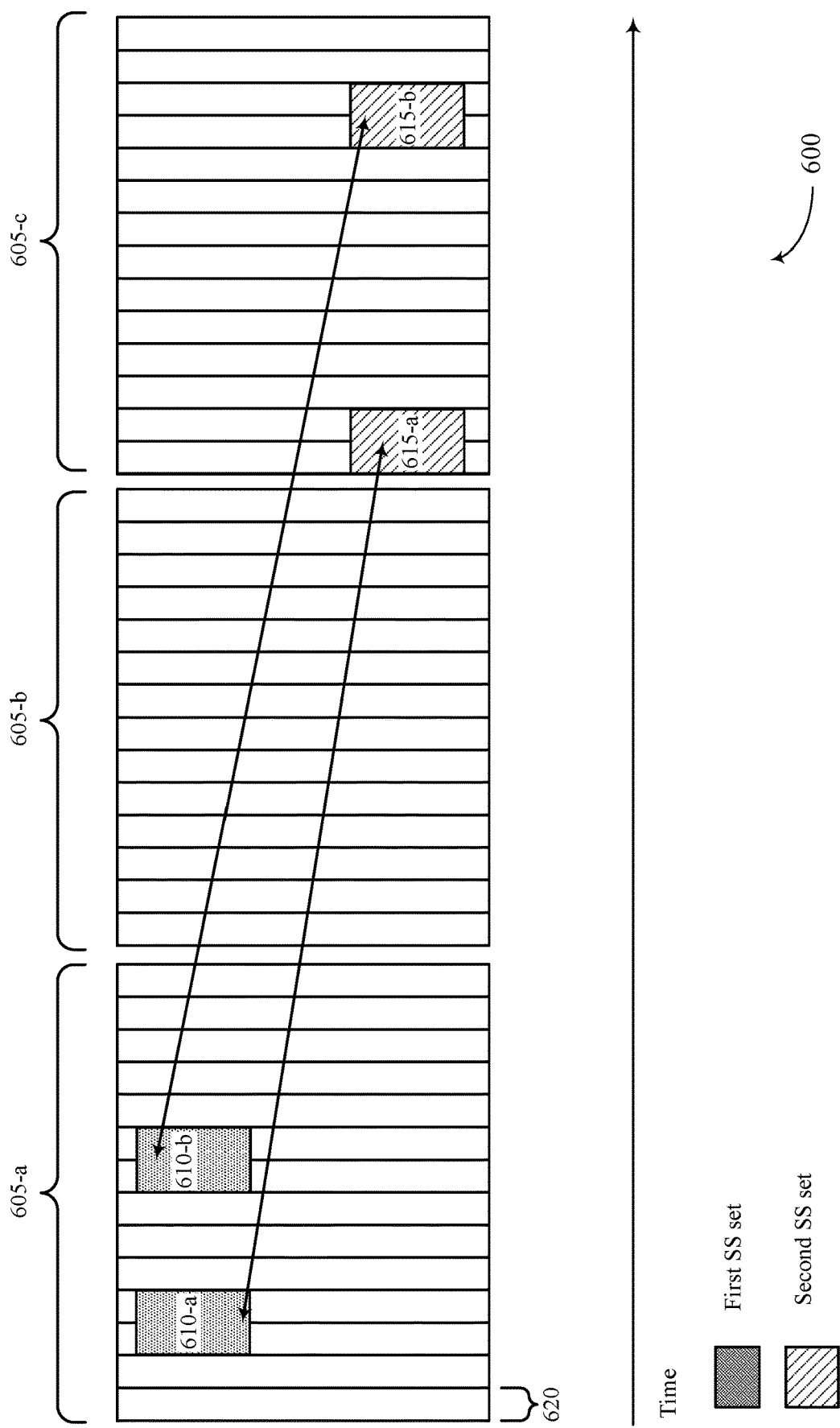
FIG. 6 illustrates an example of a timeline that supports SS set monitoring for PDCCH repetition in accordance with aspects of the present disclosure.

FIG. 6 illustrates an example of a timeline 600 that supports SS set monitoring for PDCCH repetition in accordance with aspects of the present disclosure. Timeline 600 may implement aspects of wireless communication system 100 and wireless communications system 200. For example, a base station and a UE may communicate according to timeline 500, and the base station and UE may be examples of corresponding devices described with reference to FIGS. 1 and 2.

The base station may configure one or more monitoring occasions within a single slot (e.g., via the RRC parameter monitoringSymbolsWithinSlot). In some examples for the case of inter-slot PDCCH repetition, the number of monitoring occasions in each slot may be equal to one (e.g., the number of 1s in the bitmap of the RRC parameter monitoringSymbolsWithinSlot) may be equal to 1 for both SS sets, In such examples, the UE may determine that the single monitoring occasion within a first slot of the first SS set is linked to the only monitoring occasion in a linked slot of the second SS set. In some examples, the linking of monitoring slots may be implicit based on the linking of slots as described with reference to FIGS. 4 and 5. In some cases, the base station may be constrained to configure no more than one monitoring occasion per slot of linked SS sets in different slots.

In some examples, a base station may be permitted to configure more than one monitoring occasion in each linked slot of two SS sets. The UE may expect the same number of monitoring occasions within linked slots for both SS sets (e.g., may expect the same number of is in a bitmap of an RRC parameter monitoringSymbolsWithinSlot). In linked slots 605-a and 605-c, where two SS sets exist, the $j^{th}$ monitoring occasion of the first SS set in a first slot 605-a (e.g., slot $n_{s,f,1}^\mu$) may be linked with the $j^{th}$ monitoring occasion of the second SS set in a second slot 605-c (e.g., $n_{s,f,2}^\mu$), where $n_{s,f,1}^\mu$ and $n_{s,f,2}^\mu$ are two different slots determined according to the rules described with reference to FIG. 4. A first repetition of a control message (e.g. DCI message) may be received in a first PDCCH candidate in the first monitoring occasion (e.g., monitoring occasion 610-a) of the first SS set, and a second repetition of a control message (e.g., DCI message) may be received in a first PDCCH candidates (e.g., that is linked with the first PDDCH candidate in monitoring occasion 610-a) in the first monitoring occasion (e.g., monitoring occasion 615-a) of the second SS set. The UE may soft combine the DCI received in the first PDCCH candidate in the first SS set with the DCI received in the first PDDCH candidates win the second SS set.

In some examples, the UE may determine that slot 605-a is linked with slot 605-c (e.g., using one or more rules as described with reference FIGS. 4 and 5). Monitoring occasions 610-a and 610-b of a first SS set may be located in slot 605-a, and monitoring occasions 615-a and 615-b of a second SS set may be located in slot 605-c. The UE may expect a same number of monitoring occasions within slot 605-a for both SS sets. For instance, the UE may verify that a same number of is exist in an RRC indication (e.g., monitoringSymbolsWithinSlot) for the first SS set as exist in an RRC indication (e.g., monitoringSymbolsWithinSlot) for the second SS set. In such examples, the UE may determine that monitoring occasions having the same index values (j) in the two SS sets are linked.

For example, the first SS set may be configured with an RRC parameter monitoringSymbolsWithinSlot including two is (e.g., a bitmap 00100001000000), which may indicate that monitoring occasion 610-a (e.g., associated with a CORESET having 2 symbols 620) starts during a third symbol 620 of slot 605-a and that monitoring occasion 610-b starts during a eighth symbol 620 of slot 605-a. The second SS set may be configured with an RRC parameter monitoringSymbolsWithinSlot including two 1s (a bitmap 10000000001000), which may indicate that monitoring occasion 615-a (e.g., associated with a CORESET having 2 symbols) starts during a first symbol 620 of slot 605-c and that monitoring occasion 615-b starts during a eleventh symbol 620 of slot 605-c. Because both bitmaps include the same number of 1s, indicating a same number of monitoring occasions, the UE may verify that the same number of monitoring occasions exist within slot 605-a and slot 605-b. Thus, the UE may determine that monitoring occasion 615-a of the first SS set is linked with monitoring occasion 615-a of the second SS set (e.g., the first monitoring occasion of each SS set having the same index value) and may determine that monitoring occasion 610-b of the first SS set is linked with monitoring occasion 615-b of the second SS set (e.g., the second monitoring occasion of each SS set having the same index value). Individual PDCCH candidates in linked monitoring occasions may be linked with each other for PDCCH repetition.

In linked slots 605-a and 605-c, where two SS sets exist, the $j^{th}$ monitoring occasion of the first SS set may be linked with the $j^{th}$ monitoring occasion of the second SS set. A first repetition of a control message (e.g. DCI message) may be received in a first PDCCH candidate in the first monitoring occasion (e.g., monitoring occasion 325-a) of the first SS set, and a second repetition of a control message (e.g., DCI message) may be received in a first PDCCH candidates (e.g., that is linked with the first PDDCH candidate in monitoring occasion 325-a) in the first monitoring occasion (e.g., monitoring occasion 330-a) of the second SS set. The UE may soft combine the DCI received in the first PDCCH candidate in the first SS set with the DCI received in the first PDDCH candidates win the second SS set.

Figure 7:
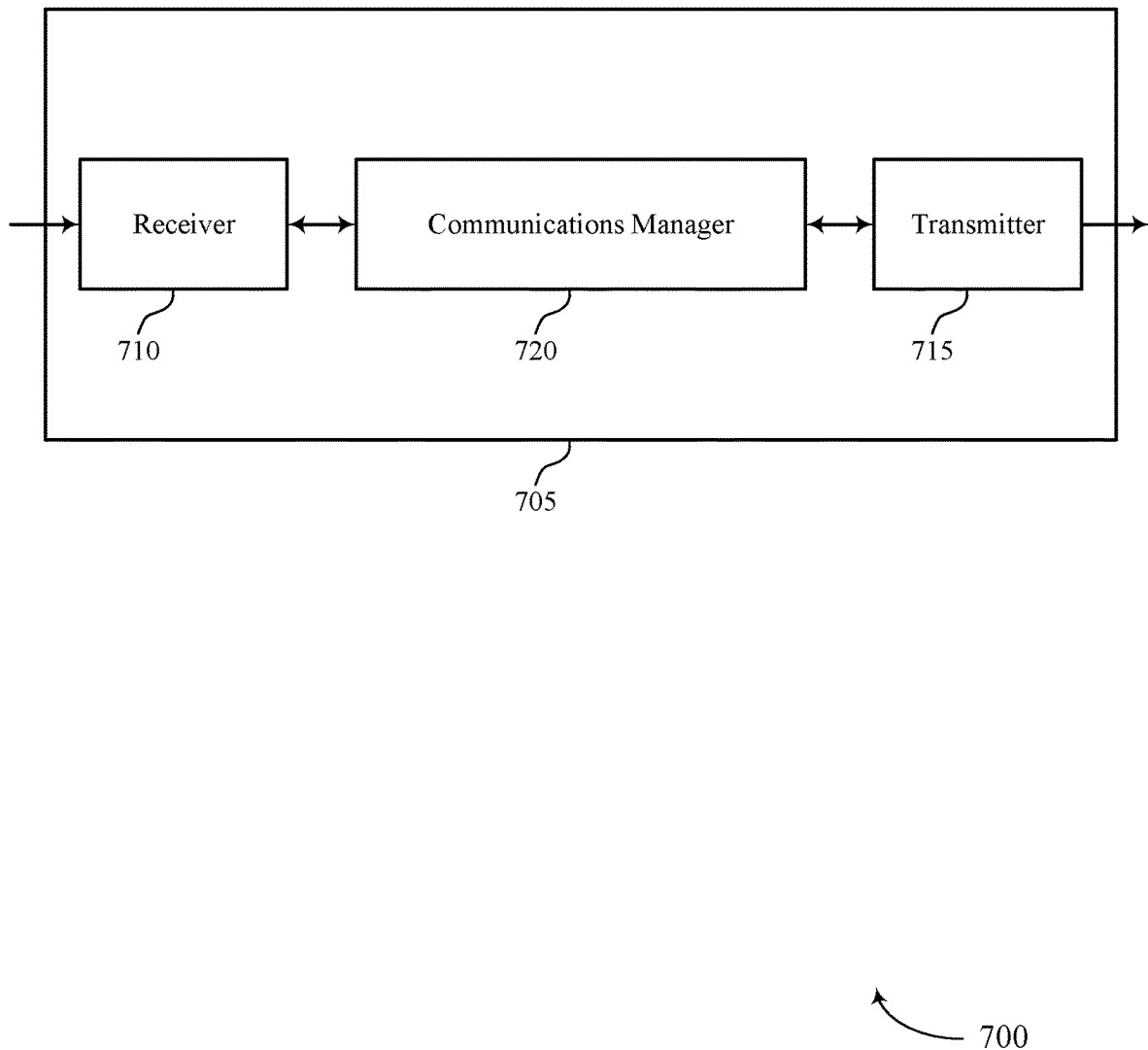
FIGS. 7 and 8 show block diagrams of devices that support SS set monitoring for PDCCH repetition in accordance with aspects of the present disclosure.

FIG. 7 shows a block diagram 700 of a device 705 that supports SS set monitoring for PDCCH repetition in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to SS set monitoring for PDCCH repetition). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to SS set monitoring for PDCCH repetition). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of SS set monitoring for PDCCH repetition as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry), software (e.g., executed by a processor), or any combination thereof. The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in hardware, software (e.g., executed by a processor), or any combination thereof. If implemented in software executed by a processor, the functions of the communications manager 720, the receiver 710, the transmitter 715, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a base station, a configuration that indicates a first monitoring pattern for a first SS set within a transmission time interval and a second monitoring pattern for a second SS set within the transmission time interval. The communications manager 720 may be configured as or otherwise support a means for receiving, from the base station, an indication that a first group of downlink control channel candidates in the first SS set are linked with a second group of downlink control channel candidates in the second SS set for downlink control channel repetition. The communications manager 720 may be configured as or otherwise support a means for monitoring the first group of downlink control channel candidates of the first SS set and the second group of downlink control channel candidates of the second SS set based on the first monitoring pattern and the second monitoring pattern having a same periodicity and offset.

Additionally, or alternatively, the communications manager 720 may support wireless communications at a UE in accordance with examples as disclosed herein. For example, the communications manager 720 may be configured as or otherwise support a means for receiving, from a base station, a configuration that indicates a first monitoring pattern for a first SS set within a first transmission time interval and a second monitoring pattern for a second SS set within a second transmission time interval. The communications manager 720 may be configured as or otherwise support a means for receiving, from the base station, an indication that a first group of downlink control channel candidates in the first SS set are linked with a second group of downlink control channel candidates in the second SS set for downlink control channel repetition. The communications manager 720 may be configured as or otherwise support a means for monitoring the first group of downlink control channel candidates of the first SS set and the second group of downlink control channel candidates of the second SS set based on the first SS set and the second SS set having a same periodicity but different offsets.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for PDCCH repetition resulting in more efficient use of available resources, improved PDCCH repetition functionality, more efficient use of computational resources at the device, or the like.

Figure 8:
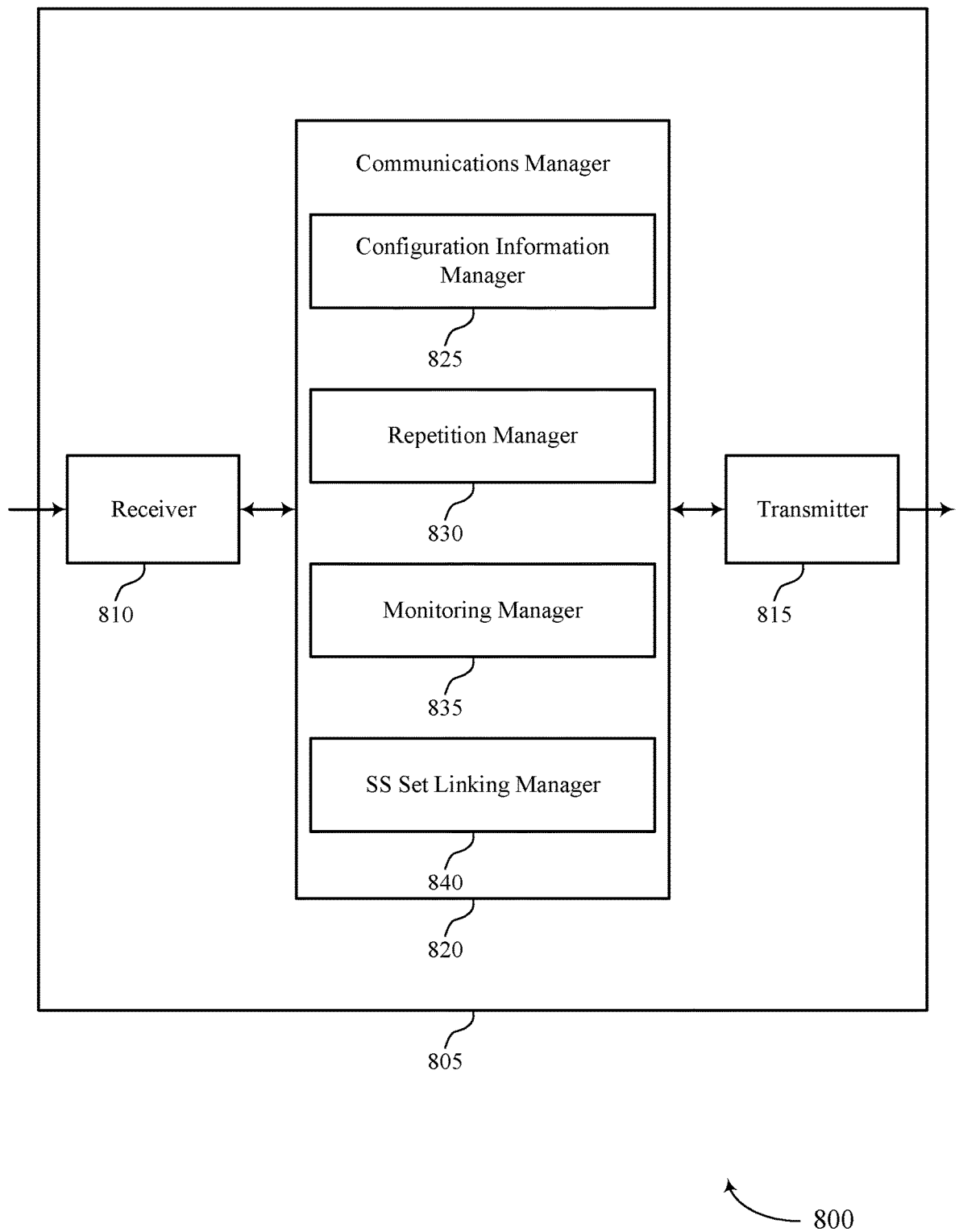

FIG. 8 shows a block diagram 800 of a device 805 that supports SS set monitoring for PDCCH repetition in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to SS set monitoring for PDCCH repetition). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to SS set monitoring for PDCCH repetition). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of SS set monitoring for PDCCH repetition as described herein.

For example, the communications manager 820 may include a configuration information manager 825, a repetition manager 830, a monitoring manager 835, an SS set linking manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The configuration information manager 825 may be configured as or otherwise support a means for receiving, from a base station, a configuration that indicates a first monitoring pattern for a first SS set within a transmission time interval and a second monitoring pattern for a second SS set within the transmission time interval. The repetition manager 830 may be configured as or otherwise support a means for receiving, from the base station, an indication that a first group of downlink control channel candidates in the first SS set are linked with a second group of downlink control channel candidates in the second SS set for downlink control channel repetition. The monitoring manager 835 may be configured as or otherwise support a means for monitoring the first group of downlink control channel candidates of the first SS set and the second group of downlink control channel candidates of the second SS set based on the first monitoring pattern and the second monitoring pattern having a same periodicity and offset.

Additionally, or alternatively, the communications manager 820 may support wireless communications at a UE in accordance with examples as disclosed herein. The configuration information manager 825 may be configured as or otherwise support a means for receiving, from a base station, a configuration that indicates a first monitoring pattern for a first SS set within a first transmission time interval and a second monitoring pattern for a second SS set within a second transmission time interval. The SS set linking manager 840 may be configured as or otherwise support a means for receiving, from the base station, an indication that a first group of downlink control channel candidates in the first SS set are linked with a second group of downlink control channel candidates in the second SS set for downlink control channel repetition. The monitoring manager 835 may be configured as or otherwise support a means for monitoring the first group of downlink control channel candidates of the first SS set and the second group of downlink control channel candidates of the second SS set based on the first SS set and the second SS set having a same periodicity but different offsets.

Figure 9:
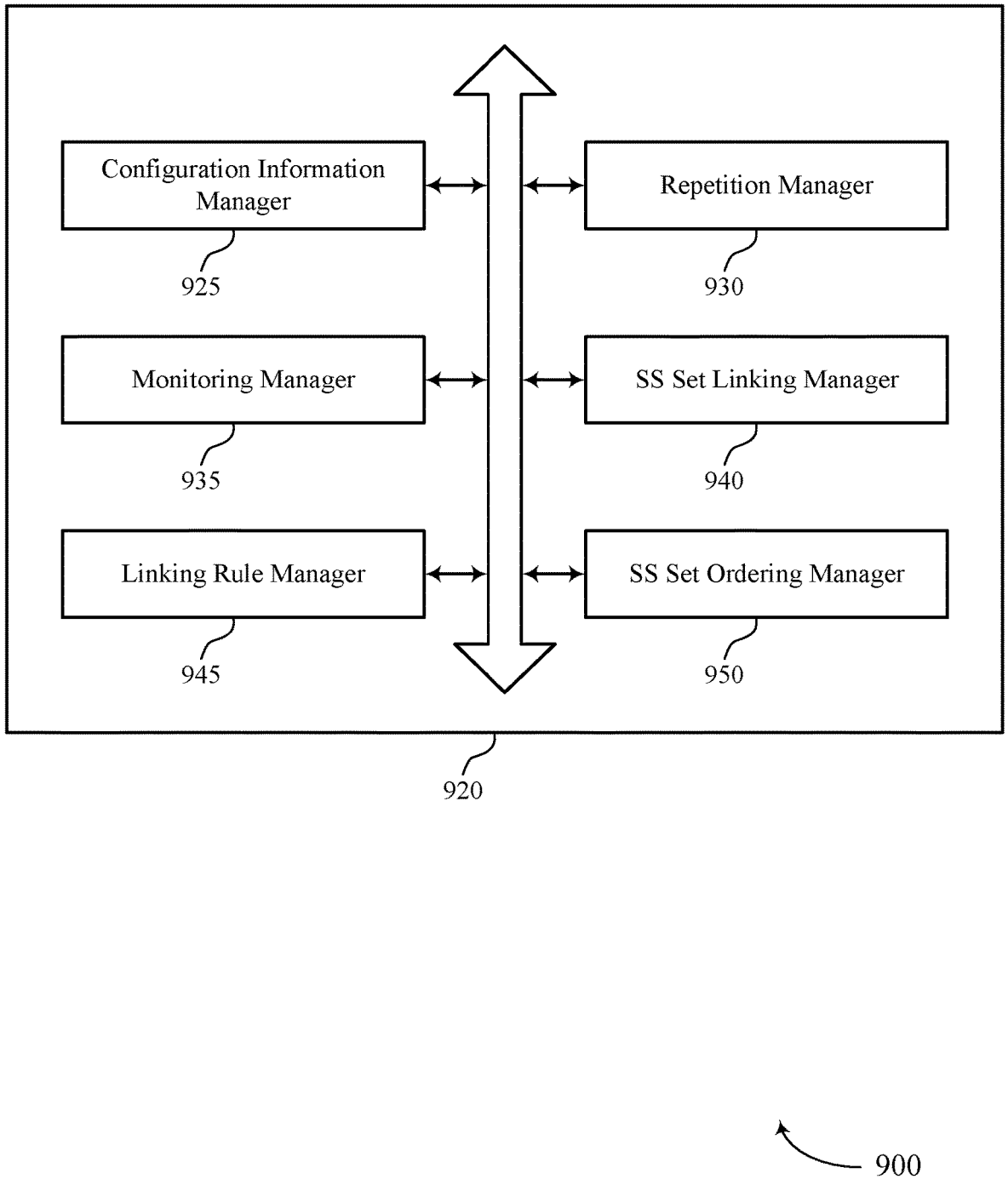
FIG. 9 shows a block diagram of a communications manager that supports SS set monitoring for PDCCH repetition in accordance with aspects of the present disclosure.

FIG. 9 shows a block diagram 900 of a communications manager 920 that supports SS set monitoring for PDCCH repetition in accordance with aspects of the present disclosure. The communications manager 920 may be an example of aspects of a communications manager 720, a communications manager 820, or both, as described herein. The communications manager 920, or various components thereof, may be an example of means for performing various aspects of SS set monitoring for PDCCH repetition as described herein. For example, the communications manager 920 may include a configuration information manager 925, a repetition manager 930, a monitoring manager 935, an SS set linking manager 940, a linking rule manager 945, an SS set ordering manager 950, or any combination thereof. Each of these components may communicate, directly or indirectly, with one another (e.g., via one or more buses).

The communications manager 920 may support wireless communications at a UE in accordance with examples as disclosed herein. The configuration information manager 925 may be configured as or otherwise support a means for receiving, from a base station, a configuration that indicates a first monitoring pattern for a first SS set within a transmission time interval and a second monitoring pattern for a second SS set within the transmission time interval. The repetition manager 930 may be configured as or otherwise support a means for receiving, from the base station, an indication that a first group of downlink control channel candidates in the first SS set are linked with a second group of downlink control channel candidates in the second SS set for downlink control channel repetition. The monitoring manager 935 may be configured as or otherwise support a means for monitoring the first group of downlink control channel candidates of the first SS set and the second group of downlink control channel candidates of the second SS set based on the first monitoring pattern and the second monitoring pattern having a same periodicity and offset.

In some examples, the SS set linking manager 940 may be configured as or otherwise support a means for verifying that a number of monitoring occasions of the first monitoring pattern is the same as a number of monitoring occasions of the second monitoring pattern, where monitoring the first group of downlink control channel candidates and the second group of downlink control channel candidates is further based on the verification.

In some examples, the SS set linking manager 940 may be configured as or otherwise support a means for determining, based on verifying that the first monitoring pattern and the second monitoring pattern have the same number of monitoring occasions, that monitoring occasions from each of the first SS and the second SS are linked based on a temporal ordering of monitoring occasions within the first SS and the second SS respectively.

In some examples, the SS set linking manager 940 may be configured as or otherwise support a means for determining, based on verifying that the first monitoring pattern and the second monitoring pattern have the same number of monitoring occasions, that monitoring occasions from each of the first SS and the second SS are linked based on an order of index values associated with monitoring occasions within the first SS and the second SS respectively.

In some examples, the SS set linking manager 940 may be configured as or otherwise support a means for determining, based on verifying that the first monitoring pattern and the second monitoring pattern have the same number of monitoring occasions, that a first monitoring occasion of the first SS set is linked with a second monitoring occasion of the second SS set.

In some examples, the SS set linking manager 940 may be configured as or otherwise support a means for determining, based on determining that the first monitoring occasion is linked with the second monitoring occasion, that a first downlink control channel candidate of the first group of downlink control channel candidates located in the first monitoring occasion is linked with a second downlink control channel candidate of the second group of downlink control channel candidates located in the second monitoring occasion.

In some examples, the repetition manager 930 may be configured as or otherwise support a means for receiving, based on the monitoring, a first repetition of a downlink control message on the first downlink control channel candidate and a second repetition of the downlink control message on the second downlink control channel candidate. In some examples, the repetition manager 930 may be configured as or otherwise support a means for combining the first repetition of the downlink control message and the second repetition of the downlink control message.

In some examples, the SS set linking manager 940 may be configured as or otherwise support a means for verifying that a duration of the first SS set within a period of the monitoring pattern is the same as a duration of the second SS set within a period of the monitoring pattern, where monitoring the first group of downlink control channel candidates and the second group of downlink control channel candidates is further based on the verification.

Additionally, or alternatively, the communications manager 920 may support wireless communications at a UE in accordance with examples as disclosed herein. In some examples, the configuration information manager 925 may be configured as or otherwise support a means for receiving, from a base station, a configuration that indicates a first monitoring pattern for a first SS set within a first transmission time interval and a second monitoring pattern for a second SS set within a second transmission time interval. The SS set linking manager 940 may be configured as or otherwise support a means for receiving, from the base station, an indication that a first group of downlink control channel candidates in the first SS set are linked with a second group of downlink control channel candidates in the second SS set for downlink control channel repetition. In some examples, the monitoring manager 935 may be configured as or otherwise support a means for monitoring the first group of downlink control channel candidates of the first SS set and the second group of downlink control channel candidates of the second SS set based on the first SS set and the second SS set having a same periodicity but different offsets.

In some examples, the linking rule manager 945 may be configured as or otherwise support a means for comparing the first monitoring pattern and the second monitoring pattern to determine whether a set of one or more rules are satisfied. In some examples, the linking rule manager 945 may be configured as or otherwise support a means for determining, based on the one or more rules being satisfied, that a first downlink control channel candidate of the first group of downlink control channel candidates is linked with a second downlink control channel candidate of the second group of downlink control channel candidates.

In some examples, the linking rule manager 945 may be configured as or otherwise support a means for determining that the one or more rules are satisfied based at least part on a first slot number of the first transmission time interval, a first frame number associated with the first transmission time interval, a first offset of the first SS set, a second slot number of the second transmission time interval, a second frame number associated with the second transmission time interval, a second offset of the second SS set, or any combination thereof, where the second frame number multiplied by the number of slots per frame plus the second slot number of slots is greater than the first frame number times the number of slots per frame plus the second slot number, which is greater than the second frame number multiplied by the number of frames per slot plus the second slot number minus the period of the same periodicity of the first SS set and the second SS set.

In some examples, the SS set ordering manager 950 may be configured as or otherwise support a means for ordering the first SS set and the second SS set, where determining that the one or more rules are satisfied is based on ordering the first SS set and the second SS set.

In some examples, the SS set ordering manager 950 may be configured as or otherwise support a means for receiving, from the base station, an indication that the first SS set is ordered before the second SS set.

In some examples, the SS set ordering manager 950 may be configured as or otherwise support a means for identifying a first index for the first SS set and a second index for the second SS set, where comparing the first monitoring pattern and the second monitoring pattern includes comparing the first index with the second index.

In some examples, the repetition manager 930 may be configured as or otherwise support a means for receiving, based on the one or more rules being satisfied, a first repetition of a downlink control message on the first downlink control channel candidate and a second repetition of the downlink control message on the second downlink control channel candidate. In some examples, the repetition manager 930 may be configured as or otherwise support a means for combining the first repetition of the downlink control message and the second repetition of the downlink control message.

In some examples, the linking rule manager 945 may be configured as or otherwise support a means for determining, based on determining whether the one or more rules are satisfied, that the first transmission time interval is located prior to the second transmission time interval.

In some examples, a duration of the first SS set within a period of the monitoring pattern is the same as a duration of the second SS set within a period of the monitoring pattern.

In some examples, the duration includes the transmission time interval.

In some examples, the duration includes a set of consecutive transmission time intervals.

In some examples, the SS set linking manager 940 may be configured as or otherwise support a means for verifying that a number of monitoring occasions of the first monitoring pattern is the same as a number of monitoring occasions of the second monitoring pattern. In some examples, the SS set linking manager 940 may be configured as or otherwise support a means for determining, based on verifying that the first monitoring pattern and the second monitoring pattern have the same number of monitoring occasions, that a first monitoring occasion of the first SS set is linked with a second monitoring occasion of the second SS set. In some examples, the SS set linking manager 940 may be configured as or otherwise support a means for determining, based on determining the first monitoring occasion is linked with the second monitoring occasion, that a first downlink control channel candidate of the first group of downlink control channel candidates is linked with a second downlink control channel candidate of the second group of downlink control channel candidates.

In some examples, the repetition manager 930 may be configured as or otherwise support a means for receiving, based on the monitoring, a first repetition of a downlink control message on the first downlink control channel candidate and a second repetition of the downlink control message on the second downlink control channel candidate. In some examples, the repetition manager 930 may be configured as or otherwise support a means for combining the first repetition of the downlink control message and the second repetition of the downlink control message.

Figure 10:
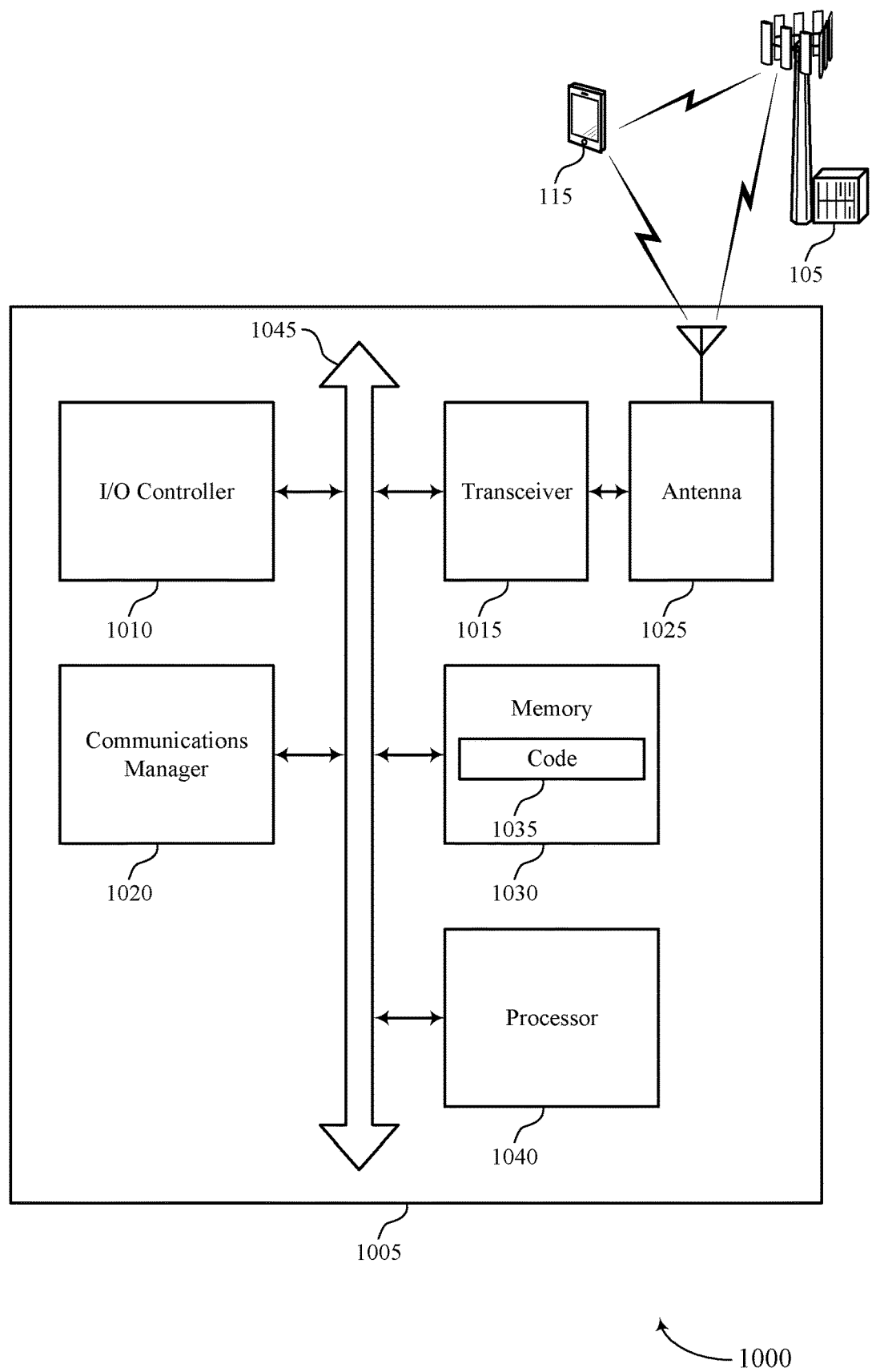
FIG. 10 shows a diagram of a system including a device that supports SS set monitoring for PDCCH repetition in accordance with aspects of the present disclosure.

FIG. 10 shows a diagram of a system 1000 including a device 1005 that supports SS set monitoring for PDCCH repetition in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be coupled with or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting SS set monitoring for PDCCH repetition). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a base station, a configuration that indicates a first monitoring pattern for a first SS set within a transmission time interval and a second monitoring pattern for a second SS set within the transmission time interval. The communications manager 1020 may be configured as or otherwise support a means for receiving, from the base station, an indication that a first group of downlink control channel candidates in the first SS set are linked with a second group of downlink control channel candidates in the second SS set for downlink control channel repetition. The communications manager 1020 may be configured as or otherwise support a means for monitoring the first group of downlink control channel candidates of the first SS set and the second group of downlink control channel candidates of the second SS set based on the first monitoring pattern and the second monitoring pattern having a same periodicity and offset.

Additionally, or alternatively, the communications manager 1020 may support wireless communications at a UE in accordance with examples as disclosed herein. For example, the communications manager 1020 may be configured as or otherwise support a means for receiving, from a base station, a configuration that indicates a first monitoring pattern for a first SS set within a first transmission time interval and a second monitoring pattern for a second SS set within a second transmission time interval. The communications manager 1020 may be configured as or otherwise support a means for receiving, from the base station, an indication that a first group of downlink control channel candidates in the first SS set are linked with a second group of downlink control channel candidates in the second SS set for downlink control channel repetition. The communications manager 1020 may be configured as or otherwise support a means for monitoring the first group of downlink control channel candidates of the first SS set and the second group of downlink control channel candidates of the second SS set based on the first SS set and the second SS set having a same periodicity but different offsets.

By including or configuring the communications manager 1020 in accordance with examples as described herein, the device 1005 may support techniques for PDCCH repetition resulting in more efficient use of available resources, improved PDCCH repetition functionality, more efficient use of computational resources at the device, or the like.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of SS set monitoring for PDCCH repetition as described herein, or the processor 1040 and the memory 1030 may be otherwise configured to perform or support such operations.

Figure 11:
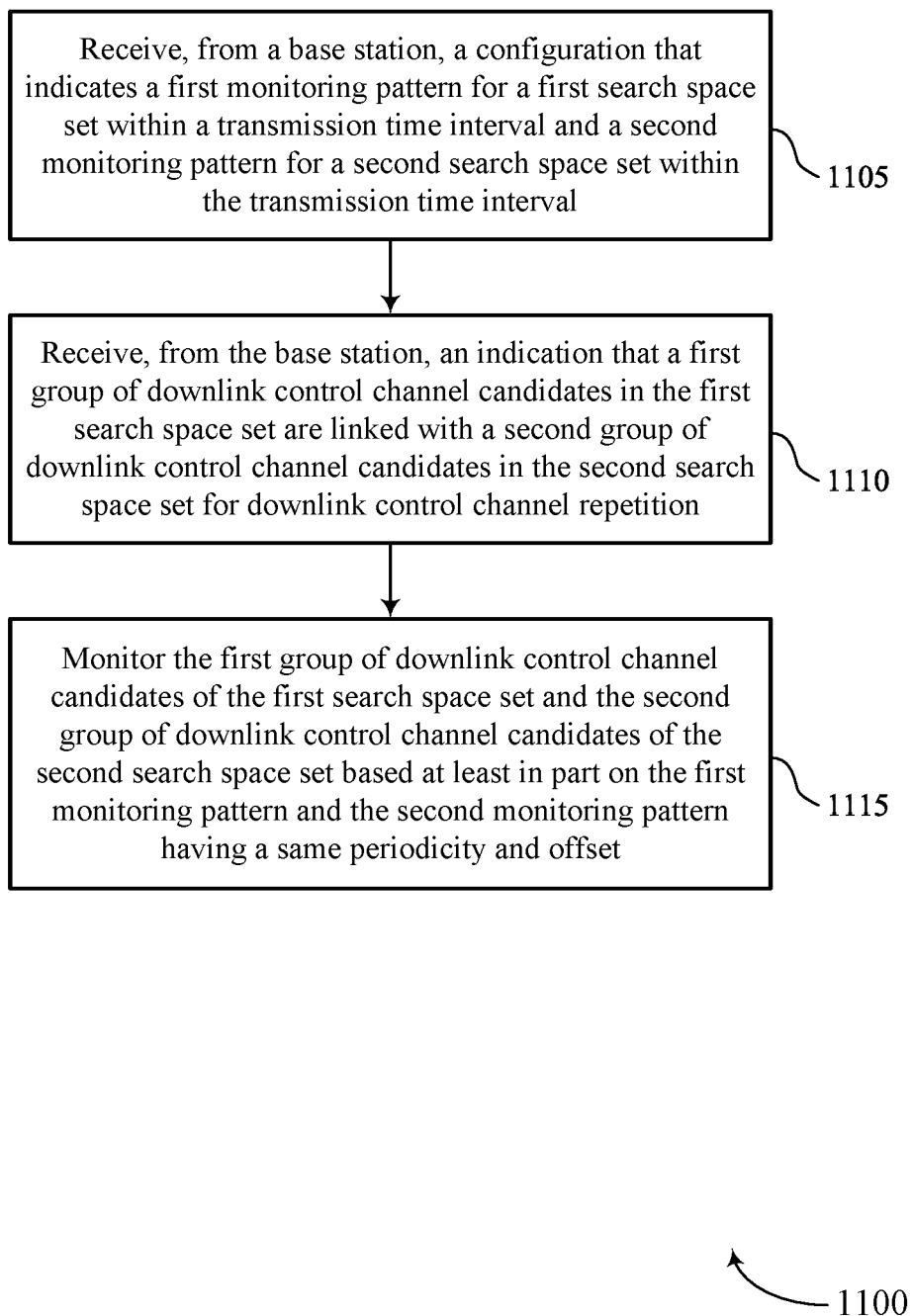
FIGS. 11 through 14 show flowcharts illustrating methods that support SS set monitoring for PDCCH repetition in accordance with aspects of the present disclosure.

FIG. 11 shows a flowchart illustrating a method 1100 that supports SS set monitoring for PDCCH repetition in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving, from a base station, a configuration that indicates a first monitoring pattern for a first SS set within a transmission time interval and a second monitoring pattern for a second SS set within the transmission time interval. The operations of 1105 may be performed in accordance with examples as disclosed herein. In some examples, aspects of the operations of 1105 may be performed by a configuration information manager 925 as described with reference to FIG. 9.

At 1110, the method may include receiving, from the base station, an indication that a first group of downlink control channel candidates in the first SS set are linked with a second group of downlink control channel candidates in the second SS set for downlink control channel repetition. The operations of 1110 may be performed in accordance with examples as disclosed herein. In some examples, aspects of the operations of 1110 may be performed by a repetition manager 930 as described with reference to FIG. 9.

At 1115, the method may include monitoring the first group of downlink control channel candidates of the first SS set and the second group of downlink control channel candidates of the second SS set based on the first monitoring pattern and the second monitoring pattern having a same periodicity and offset. The operations of 1115 may be performed in accordance with examples as disclosed herein. In some examples, aspects of the operations of 1115 may be performed by a monitoring manager 935 as described with reference to FIG. 9.

Figure 12:
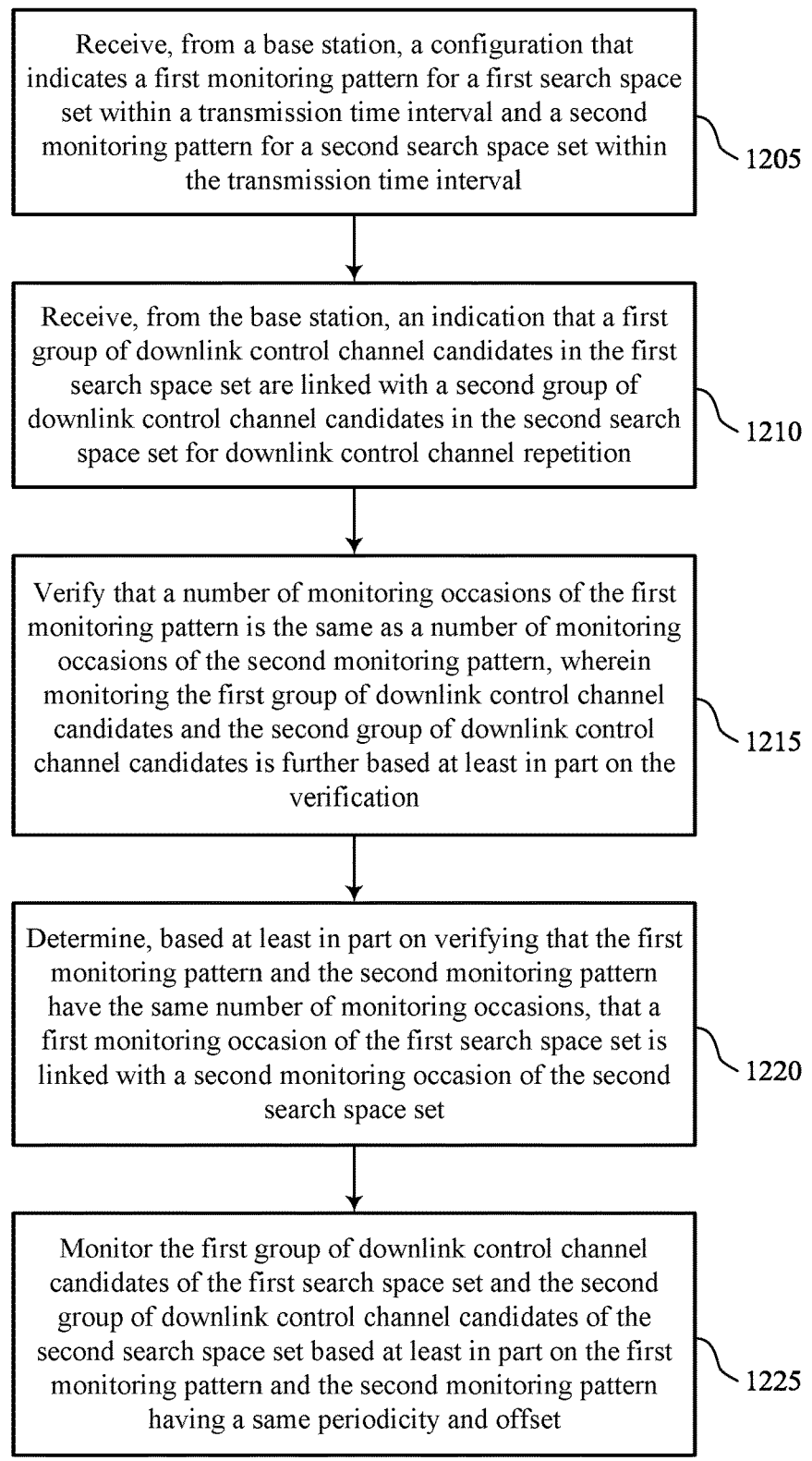

FIG. 12 shows a flowchart illustrating a method 1200 that supports SS set monitoring for PDCCH repetition in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving, from a base station, a configuration that indicates a first monitoring pattern for a first SS set within a transmission time interval and a second monitoring pattern for a second SS set within the transmission time interval. The operations of 1205 may be performed in accordance with examples as disclosed herein. In some examples, aspects of the operations of 1205 may be performed by a configuration information manager 925 as described with reference to FIG. 9.

At 1210, the method may include receiving, from the base station, an indication that a first group of downlink control channel candidates in the first SS set are linked with a second group of downlink control channel candidates in the second SS set for downlink control channel repetition. The operations of 1210 may be performed in accordance with examples as disclosed herein. In some examples, aspects of the operations of 1210 may be performed by a repetition manager 930 as described with reference to FIG. 9.

At 1215, the method may include verifying that a number of monitoring occasions of the first monitoring pattern is the same as a number of monitoring occasions of the second monitoring pattern, where monitoring the first group of downlink control channel candidates and the second group of downlink control channel candidates is further based on the verification. The operations of 1215 may be performed in accordance with examples as disclosed herein. In some examples, aspects of the operations of 1215 may be performed by an SS set linking manager 940 as described with reference to FIG. 9.

At 1220, the method may include determining, based on verifying that the first monitoring pattern and the second monitoring pattern have the same number of monitoring occasions, that a first monitoring occasion of the first SS set is linked with a second monitoring occasion of the second SS set. The operations of 1220 may be performed in accordance with examples as disclosed herein. In some examples, aspects of the operations of 1220 may be performed by an SS set linking manager 940 as described with reference to FIG. 9.

At 1225, the method may include monitoring the first group of downlink control channel candidates of the first SS set and the second group of downlink control channel candidates of the second SS set based on the first monitoring pattern and the second monitoring pattern having a same periodicity and offset. The operations of 1225 may be performed in accordance with examples as disclosed herein. In some examples, aspects of the operations of 1225 may be performed by a monitoring manager 935 as described with reference to FIG. 9.

Figure 13:
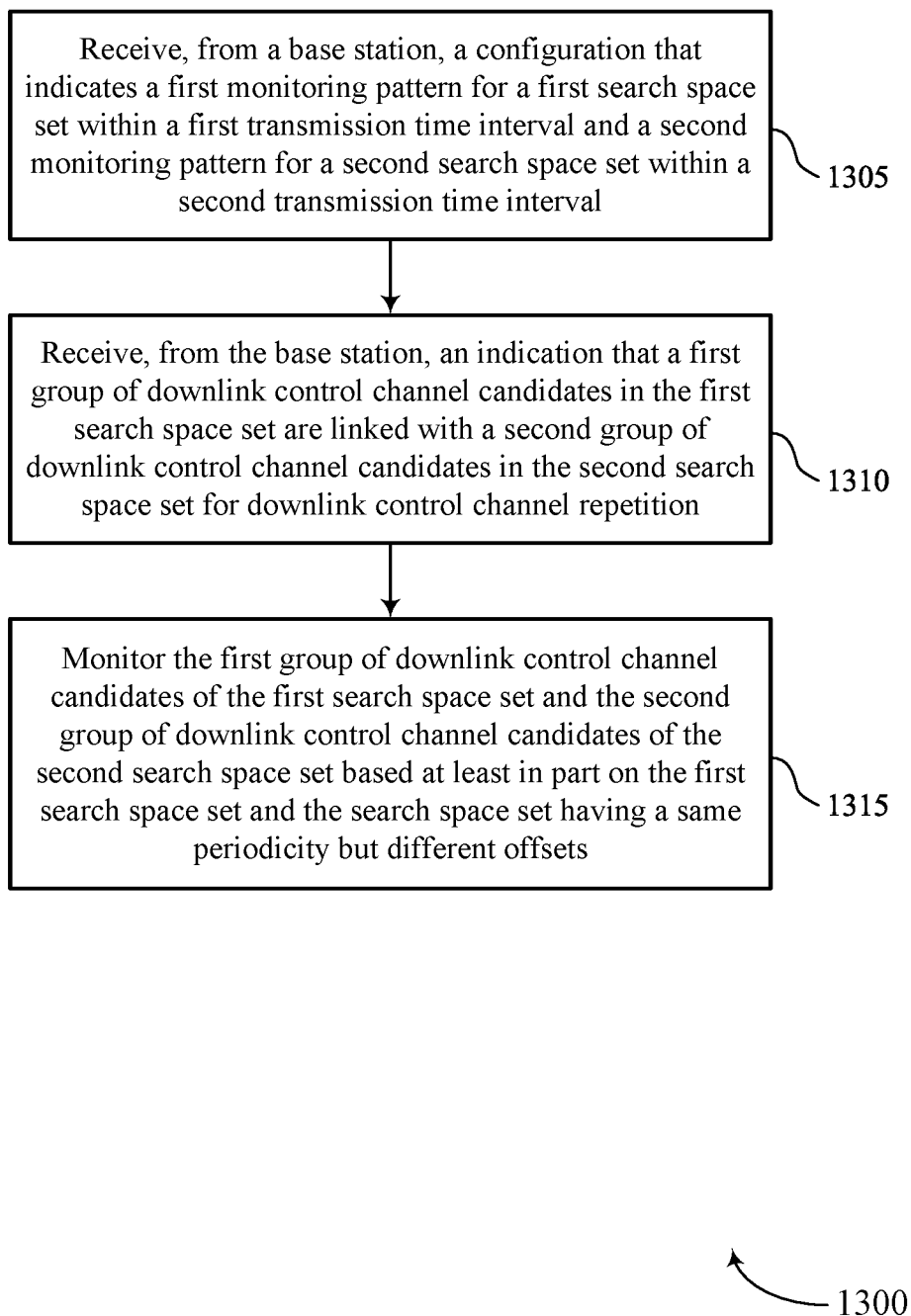

FIG. 13 shows a flowchart illustrating a method 1300 that supports SS set monitoring for PDCCH repetition in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include receiving, from a base station, a configuration that indicates a first monitoring pattern for a first SS set within a first transmission time interval and a second monitoring pattern for a second SS set within a second transmission time interval. The operations of 1305 may be performed in accordance with examples as disclosed herein. In some examples, aspects of the operations of 1305 may be performed by a configuration information manager 925 as described with reference to FIG. 9.

At 1310, the method may include receiving, from the base station, an indication that a first group of downlink control channel candidates in the first SS set are linked with a second group of downlink control channel candidates in the second SS set for downlink control channel repetition. The operations of 1310 may be performed in accordance with examples as disclosed herein. In some examples, aspects of the operations of 1310 may be performed by an SS set linking manager 940 as described with reference to FIG. 9.

At 1315, the method may include monitoring the first group of downlink control channel candidates of the first SS set and the second group of downlink control channel candidates of the second SS set based on the first SS set and the second SS set having a same periodicity but different offsets. The operations of 1315 may be performed in accordance with examples as disclosed herein. In some examples, aspects of the operations of 1315 may be performed by a monitoring manager 935 as described with reference to FIG. 9.

Figure 14:
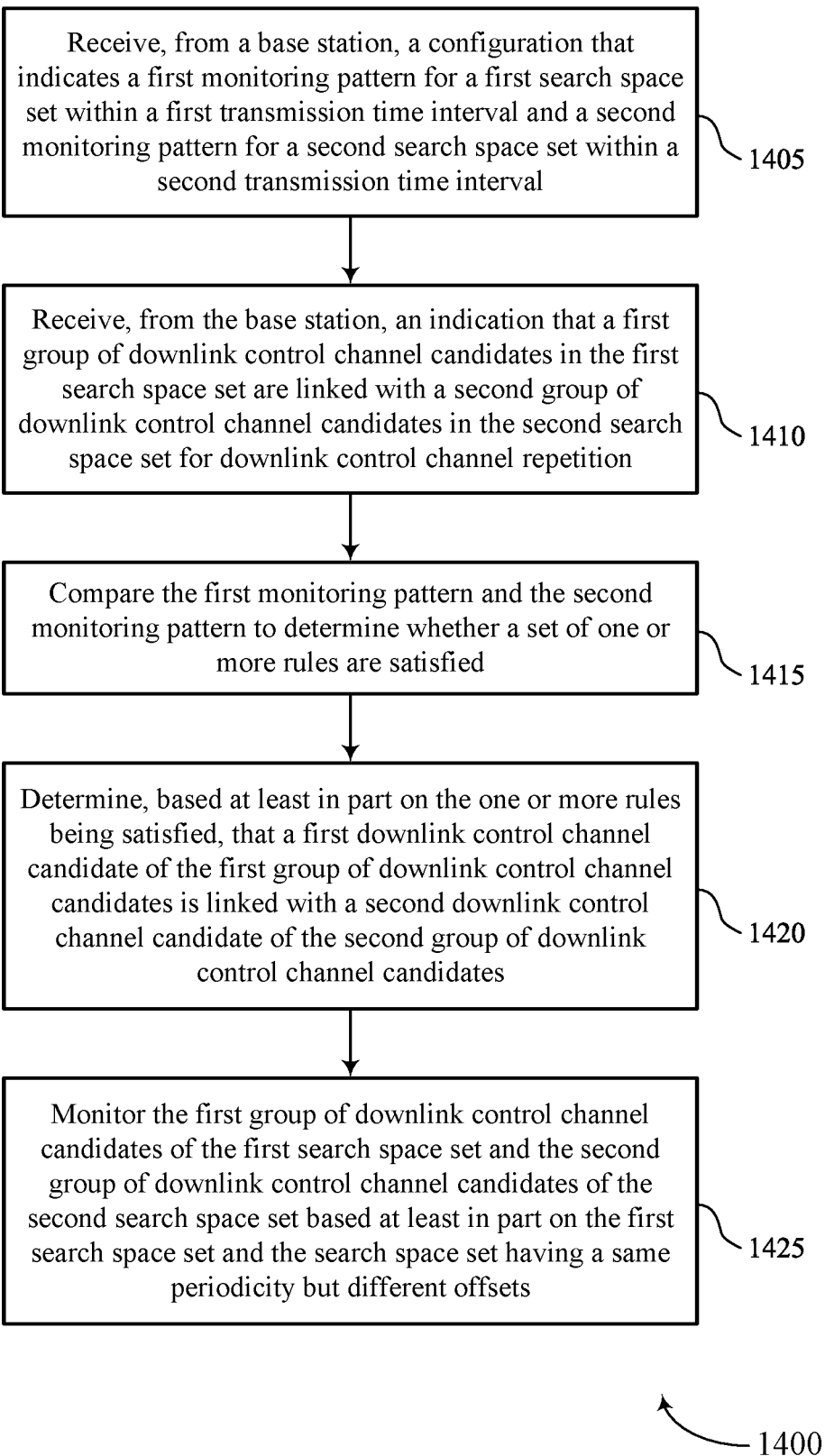

FIG. 14 shows a flowchart illustrating a method 1400 that supports SS set monitoring for PDCCH repetition in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include receiving, from a base station, a configuration that indicates a first monitoring pattern for a first SS set within a first transmission time interval and a second monitoring pattern for a second SS set within a second transmission time interval. The operations of 1405 may be performed in accordance with examples as disclosed herein. In some examples, aspects of the operations of 1405 may be performed by a configuration information manager 925 as described with reference to FIG. 9.

At 1410, the method may include receiving, from the base station, an indication that a first group of downlink control channel candidates in the first SS set are linked with a second group of downlink control channel candidates in the second SS set for downlink control channel repetition. The operations of 1410 may be performed in accordance with examples as disclosed herein. In some examples, aspects of the operations of 1410 may be performed by an SS set linking manager 940 as described with reference to FIG. 9.

At 1415, the method may include comparing the first monitoring pattern and the second monitoring pattern to determine whether a set of one or more rules are satisfied. The operations of 1415 may be performed in accordance with examples as disclosed herein. In some examples, aspects of the operations of 1415 may be performed by a linking rule manager 945 as described with reference to FIG. 9.

At 1420, the method may include determining, based on the one or more rules being satisfied, that a first downlink control channel candidate of the first group of downlink control channel candidates is linked with a second downlink control channel candidate of the second group of downlink control channel candidates. The operations of 1420 may be performed in accordance with examples as disclosed herein. In some examples, aspects of the operations of 1420 may be performed by a linking rule manager 945 as described with reference to FIG. 9.

At 1425, the method may include monitoring the first group of downlink control channel candidates of the first SS set and the second group of downlink control channel candidates of the second SS set based on the first SS set and the second SS set having a same periodicity but different offsets. The operations of 1425 may be performed in accordance with examples as disclosed herein. In some examples, aspects of the operations of 1425 may be performed by a monitoring manager 935 as described with reference to FIG. 9.

The following provides an overview of aspects of the present disclosure:

Aspect 1: A method for wireless communications at a UE, comprising: receiving, from a base station, a configuration that indicates a first monitoring pattern for a first SS set within a transmission time interval and a second monitoring pattern for a second SS set within the transmission time interval; receiving, from the base station, an indication that a first group of downlink control channel candidates in the first SS set are linked with a second group of downlink control channel candidates in the second SS set for downlink control channel repetition; and monitoring the first group of downlink control channel candidates of the first SS set and the second group of downlink control channel candidates of the second SS set based at least in part on the first monitoring pattern and the second monitoring pattern having a same periodicity and offset.

Aspect 2: The method of aspect 1, further comprising: verifying that a number of monitoring occasions of the first monitoring pattern is the same as a number of monitoring occasions of the second monitoring pattern, wherein monitoring the first group of downlink control channel candidates and the second group of downlink control channel candidates is further based at least in part on the verification.

Aspect 3: The method of aspect 2, further comprising: determining, based at least in part on verifying that the first monitoring pattern and the second monitoring pattern have the same number of monitoring occasions, that monitoring occasions from each of the first SS and the second SS are linked based at least in part on a temporal ordering of monitoring occasions within the first SS and the second SS respectively.

Aspect 4: The method of aspect 2, further comprising: determining, based at least in part on verifying that the first monitoring pattern and the second monitoring pattern have the same number of monitoring occasions, that monitoring occasions from each of the first SS and the second SS are linked based at least in part on an order of index values associated with monitoring occasions within the first SS and the second SS respectively.

Aspect 5: The method of aspect 2, further comprising: determining, based at least in part on verifying that the first monitoring pattern and the second monitoring pattern have the same number of monitoring occasions, that a first monitoring occasion of the first SS set is linked with a second monitoring occasion of the second SS set.

Aspect 6: The method of aspect 5, further comprising: determining, based at least in part on determining that the first monitoring occasion is linked with the second monitoring occasion, that a first downlink control channel candidate of the first group of downlink control channel candidates located in the first monitoring occasion is linked with a second downlink control channel candidate of the second group of downlink control channel candidates located in the second monitoring occasion.

Aspect 7: The method of aspect 6, further comprising: receiving, based at least in part on the monitoring, a first repetition of a downlink control message on the first downlink control channel candidate and a second repetition of the downlink control message on the second downlink control channel candidate; and combining the first repetition of the downlink control message and the second repetition of the downlink control message.

Aspect 8: The method of any of aspects 1 through 7, further comprising: verifying that a duration of the first SS set within a period of the monitoring pattern is the same as a duration of the second SS set within a period of the monitoring pattern, wherein monitoring the first group of downlink control channel candidates and the second group of downlink control channel candidates is further based at least in part on the verification.

Aspect 9: A method for wireless communications at a UE, comprising: receiving, from a base station, a configuration that indicates a first monitoring pattern for a first SS set within a first transmission time interval and a second monitoring pattern for a second SS set within a second transmission time interval; receiving, from the base station, an indication that a first group of downlink control channel candidates in the first SS set are linked with a second group of downlink control channel candidates in the second SS set for downlink control channel repetition; and monitoring the first group of downlink control channel candidates of the first SS set and the second group of downlink control channel candidates of the second SS set based at least in part on the first SS set and the second SS set having a same periodicity but different offsets.

Aspect 10: The method of aspect 9, further comprising: comparing the first monitoring pattern and the second monitoring pattern to determine whether a set of one or more rules are satisfied; and determining, based at least in part on the one or more rules being satisfied, that a first downlink control channel candidate of the first group of downlink control channel candidates is linked with a second downlink control channel candidate of the second group of downlink control channel candidates.

Aspect 11: The method of aspect 10, further comprising: determining that the one or more rules are satisfied based at least part on a first slot number of the first transmission time interval, a first frame number associated with the first transmission time interval, a first offset of the first SS set, a second slot number of the second transmission time interval, a second frame number associated with the second transmission time interval, a second offset of the second SS set, or any combination thereof, wherein the second frame number multiplied by the number of slots per frame plus the second slot number of slots is greater than the first frame number times the number of slots per frame plus the second slot number, which is greater than the second frame number multiplied by the number of frames per slot plus the second slot number minus the period of the same periodicity of the first SS set and the second SS set.

Aspect 12: The method of aspect 11, further comprising: ordering the first SS set and the second SS set, wherein determining that the one or more rules are satisfied is based at least in part on ordering the first SS set and the second SS set.

Aspect 13: The method of aspect 12, further comprising: receiving, from the base station, an indication that the first SS set is ordered before the second SS set.

Aspect 14: The method of any of aspects 12 through 13, further comprising: identifying a first index for the first SS set and a second index for the second SS set, wherein comparing the first monitoring pattern and the second monitoring pattern comprises comparing the first index with the second index.

Aspect 15: The method of any of aspects 10 through 14, further comprising: receiving, based at least in part on the one or more rules being satisfied, a first repetition of a downlink control message on the first downlink control channel candidate and a second repetition of the downlink control message on the second downlink control channel candidate; and combining the first repetition of the downlink control message and the second repetition of the downlink control message.

Aspect 16: The method of any of aspects 10 through 15, further comprising: determining, based at least in part on determining whether the one or more rules are satisfied, that the first transmission time interval is located prior to the second transmission time interval.

Aspect 17: The method of any of aspects 9 through 16, wherein a duration of the first SS set within a period of the monitoring pattern is the same as a duration of the second SS set within a period of the monitoring pattern.

Aspect 18: The method of aspect 17, wherein the duration comprises the transmission time interval.

Aspect 19: The method of any of aspects 17 through 18, wherein the duration comprises a set of consecutive transmission time intervals.

Aspect 20: The method of any of aspects 9 through 19, further comprising: verifying that a number of monitoring occasions of the first monitoring pattern is the same as a number of monitoring occasions of the second monitoring pattern; determining, based at least in part on verifying that the first monitoring pattern and the second monitoring pattern have the same number of monitoring occasions, that a first monitoring occasion of the first SS set is linked with a second monitoring occasion of the second SS set; and determining, based at least in part on determining the first monitoring occasion is linked with the second monitoring occasion, that a first downlink control channel candidate of the first group of downlink control channel candidates is linked with a second downlink control channel candidate of the second group of downlink control channel candidates.

Aspect 21: The method of aspect 20, further comprising: receiving, based at least in part on the monitoring, a first repetition of a downlink control message on the first downlink control channel candidate and a second repetition of the downlink control message on the second downlink control channel candidate; and combining the first repetition of the downlink control message and the second repetition of the downlink control message.

Aspect 22: An apparatus for wireless communications at a UE, comprising at least one processor; memory coupled to the at least one processor, the memory storing instructions executable by the at least one processor to cause the apparatus to perform a method of any of aspects 1 through 8.

Aspect 23: An apparatus for wireless communications at a UE, comprising at least one means for performing a method of any of aspects 1 through 8.

Aspect 24: A non-transitory computer-readable medium storing code for wireless communications at a UE, the code comprising instructions executable by a processor to perform a method of any of aspects 1 through 8.

Aspect 25: An apparatus for wireless communications at a UE, comprising at least one processor; memory coupled to the at least one processor, the memory storing instructions executable by the at least one processor to cause the apparatus to perform a method of any of aspects 9 through 21.

Aspect 26: An apparatus for wireless communications at a UE, comprising at least one means for performing a method of any of aspects 9 through 21.

Aspect 27: A non-transitory computer-readable medium storing code for wireless communications at a UE, the code comprising instructions executable by a processor to perform a method of any of aspects 9 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a configuration that indicates a first monitoring pattern for a first search space set within a transmission time interval and a second monitoring pattern for a second search space set within the transmission time interval;
   receiving, from the base station, an indication that a first group of downlink control channel candidates in the first search space set are linked with a second group of downlink control channel candidates in the second search space set for downlink control channel repetition based at least in part on a number of monitoring occasions of the first monitoring pattern being the same as a number of monitoring occasions of the second monitoring pattern; and
   monitoring the first group of downlink control channel candidates of the first search space set and the second group of downlink control channel candidates of the second search space set based at least in part on the first monitoring pattern and the second monitoring pattern having a same periodicity and offset.

2. The method of claim 1, further comprising:
   verifying that the number of monitoring occasions of the first monitoring pattern is the same as the number of monitoring occasions of the second monitoring pattern, wherein monitoring the first group of downlink control channel candidates and the second group of downlink control channel candidates is further based at least in part on the verification.

3. The method of claim 2, further comprising:
   determining, based at least in part on verifying that the first monitoring pattern and the second monitoring pattern have the same number of monitoring occasions, that monitoring occasions from each of the first search space set and the second search space set are linked based at least in part on a temporal ordering of monitoring occasions within the first search space and the second search space respectively.

4. The method of claim 2, further comprising:
   determining, based at least in part on verifying that the first monitoring pattern and the second monitoring pattern have the same number of monitoring occasions, that monitoring occasions from each of the first search space set and the second search space set are linked based at least in part on an order of index values associated with monitoring occasions within the first search space set and the second search space set respectively.

5. The method of claim 2, further comprising:
   determining, based at least in part on verifying that the first monitoring pattern and the second monitoring pattern have the same number of monitoring occasions, that a first monitoring occasion of the first search space set is linked with a second monitoring occasion of the second search space set.

6. The method of claim 5, further comprising:
   determining, based at least in part on determining that the first monitoring occasion is linked with the second monitoring occasion, that a first downlink control channel candidate of the first group of downlink control channel candidates located in the first monitoring occasion is linked with a second downlink control channel candidate of the second group of downlink control channel candidates located in the second monitoring occasion.

7. The method of claim 6, further comprising:
   receiving, based at least in part on the monitoring, a first repetition of a downlink control message on the first downlink control channel candidate and a second repetition of the downlink control message on the second downlink control channel candidate; and
   combining the first repetition of the downlink control message and the second repetition of the downlink control message.

8. The method of claim 1, further comprising:
   verifying that a duration of the first search space set within a period of the first monitoring pattern is the same as a duration of the second search space set within a period of the second monitoring pattern, wherein monitoring the first group of downlink control channel candidates and the second group of downlink control channel candidates is further based at least in part on the verification.

9. A method for wireless communications at a user equipment (UE), comprising:
   receiving, from a base station, a configuration that indicates a first monitoring pattern for a first search space set within a first transmission time interval and a second monitoring pattern for a second search space set within a second transmission time interval;
   receiving, from the base station, an indication that a first group of downlink control channel candidates in the first search space set are linked with a second group of downlink control channel candidates in the second search space set for downlink control channel repetition based at least in part on a number of monitoring occasions of the first monitoring pattern being the same as a number of monitoring occasions of the second monitoring pattern; and
   monitoring the first group of downlink control channel candidates of the first search space set and the second group of downlink control channel candidates of the second search space set based at least in part on the first search space set and the second search space set having a same periodicity but different offsets.

10. The method of claim 9, further comprising:
    comparing the first monitoring pattern and the second monitoring pattern to determine whether a set of one or more rules are satisfied; and determining, based at least in part on the one or more rules being satisfied, that a first downlink control channel candidate of the first group of downlink control channel candidates is linked with a second downlink control channel candidate of the second group of downlink control channel candidates.

11. The method of claim 10, further comprising:
determining that the one or more rules are satisfied based at least part on a first slot number of the first transmission time interval, a first frame number associated with the first transmission time interval, a first offset of the first search space set, a second slot number of the second transmission time interval, a second frame number associated with the second transmission time interval, a second offset of the second search space set, or any combination thereof, wherein the second frame number multiplied by the number of slots per frame plus the second slot number of slots is greater than the first frame number multiplied by the number of slots per frame plus the second slot number, which is greater than the second frame number multiplied by the number of frames per slot plus the second slot number minus the period of the same periodicity of the first search space set and the second search space set.

12. The method of claim 11, further comprising:
ordering the first search space set and the second search space set, wherein determining that the one or more rules are satisfied is based at least in part on ordering the first search space set and the second search space set.

13. The method of claim 12, further comprising:
receiving, from the base station, an indication that the first search space set is ordered before the second search space set.

14. The method of claim 12, further comprising:
identifying a first index for the first search space set and a second index for the second search space set, wherein comparing the first monitoring pattern and the second monitoring pattern comprises comparing the first index with the second index.

15. The method of claim 10, further comprising:
receiving, based at least in part on the one or more rules being satisfied, a first repetition of a downlink control message on the first downlink control channel candidate and a second repetition of the downlink control message on the second downlink control channel candidate; and
combining the first repetition of the downlink control message and the second repetition of the downlink control message.

16. The method of claim 10, further comprising:
determining, based at least in part on determining whether the one or more rules are satisfied, that the first transmission time interval is located prior to the second transmission time interval.

17. The method of claim 9, wherein a duration of the first search space set within a period of the first monitoring pattern is the same as a duration of the second search space set within a period of the second monitoring pattern.

18. The method of claim 17, wherein the duration comprises a slot.

19. The method of claim 17, wherein the duration comprises a set of consecutive transmission time intervals.

20. The method of claim 9, further comprising:
verifying that the number of monitoring occasions of the first monitoring pattern is the same as the number of monitoring occasions of the second monitoring pattern;
determining, based at least in part on verifying that the first monitoring pattern and the second monitoring pattern have the same number of monitoring occasions, that a first monitoring occasion of the first search space set is linked with a second monitoring occasion of the second search space set; and
determining, based at least in part on determining the first monitoring occasion is linked with the second monitoring occasion, that a first downlink control channel candidate of the first group of downlink control channel candidates is linked with a second downlink control channel candidate of the second group of downlink control channel candidates.

21. The method of claim 20, further comprising:
receiving, based at least in part on the monitoring, a first repetition of a downlink control message on the first downlink control channel candidate and a second repetition of the downlink control message on the second downlink control channel candidate; and
combining the first repetition of the downlink control message and the second repetition of the downlink control message.

22. An apparatus for wireless communications at a user equipment (UE), comprising:
at least one processor; and
memory coupled to the at least one processor, the memory storing instructions executable by the at least one processor to cause the apparatus to:
receive, from a base station, a configuration that indicates a first monitoring pattern for a first search space set within a transmission time interval and a second monitoring pattern for a second search space set within the transmission time interval;
receive, from the base station, an indication that a first group of downlink control channel candidates in the first search space set are linked with a second group of downlink control channel candidates in the second search space set for downlink control channel repetition based at least in part on a number of monitoring occasions of the first monitoring pattern being the same as a number of monitoring occasions of the second monitoring pattern; and
monitor the first group of downlink control channel candidates of the first search space set and the second group of downlink control channel candidates of the second search space set based at least in part on the first monitoring pattern and the second monitoring pattern having a same periodicity and offset.

23. The apparatus of claim 22, wherein the instructions are further executable by the at least one processor to cause the apparatus to:
verify that the number of monitoring occasions of the first monitoring pattern is the same as the number of monitoring occasions of the second monitoring pattern, wherein monitoring the first group of downlink control channel candidates and the second group of downlink control channel candidates is further based at least in part on the verification.

24. The apparatus of claim 23, wherein the instructions are further executable by the at least one processor to cause the apparatus to:
determine, based at least in part on verifying that the first monitoring pattern and the second monitoring pattern have the same number of monitoring occasions, that monitoring occasions from each of the first search space set and the second search space set are linked based at least in part on a temporal ordering of monitoring occasions within the first search space set and the second search space set respectively.

25. The apparatus of claim 23, wherein the instructions are further executable by the at least one processor to cause the apparatus to:
determine, based at least in part on verifying that the first monitoring pattern and the second monitoring pattern have the same number of monitoring occasions, that monitoring occasions from each of the first search space set and the second search space set are linked based at least in part on an order of index values associated with monitoring occasions within the first search space set and the second search space set, respectively.

26. The apparatus of claim 23, wherein the instructions are further executable by the at least one processor to cause the apparatus to:
determine, based at least in part on verifying that the first monitoring pattern and the second monitoring pattern have the same number of monitoring occasions, that a first monitoring occasion of the first search space set is linked with a second monitoring occasion of the second search space set.

27. The apparatus of claim 26, wherein the instructions are further executable by the at least one processor to cause the apparatus to:
determine, based at least in part on determining that the first monitoring occasion is linked with the second monitoring occasion, that a first downlink control channel candidate of the first group of downlink control channel candidates located in the first monitoring occasion is linked with a second downlink control channel candidate of the second group of downlink control channel candidates located in the second monitoring occasion.

28. The apparatus of claim 27, wherein the instructions are further executable by the at least one processor to cause the apparatus to:
receive, based at least in part on the monitoring, a first repetition of a downlink control message on the first downlink control channel candidate and a second repetition of the downlink control message on the second downlink control channel candidate; and
combine the first repetition of the downlink control message and the second repetition of the downlink control message.

29. The apparatus of claim 22, wherein the instructions are further executable by the at least one processor to cause the apparatus to:
verify that a duration of the first search space set within a period of the first monitoring pattern is the same as a duration of the second search space set within a period of the second monitoring pattern, wherein monitoring the first group of downlink control channel candidates and the second group of downlink control channel candidates is further based at least in part on the verification.

30. An apparatus for wireless communications at a user equipment (UE), comprising:
at least one processor; and
memory coupled to the at least one processor, the memory storing instructions executable by the at least one processor to cause the apparatus to:
receive, from a base station, a configuration that indicates a first monitoring pattern for a first search space set within a first transmission time interval and a second monitoring pattern for a second search space set within a second transmission time interval;
receive, from the base station, an indication that a first group of downlink control channel candidates in the first search space set are linked with a second group of downlink control channel candidates in the second search space set for downlink control channel repetition based at least in part on a number of monitoring occasions of the first monitoring pattern being the same as a number of monitoring occasions of the second monitoring pattern; and
monitor the first group of downlink control channel candidates of the first search space set and the second group of downlink control channel candidates of the second search space set based at least in part on the first search space set and the second search space set having a same periodicity but different offsets.

31. The apparatus of claim 30, wherein the instructions are further executable by the at least one processor to cause the apparatus to:
compare the first monitoring pattern and the second monitoring pattern to determine whether a set of one or more rules are satisfied; and
determine, based at least in part on the one or more rules being satisfied, that a first downlink control channel candidate of the first group of downlink control channel candidates is linked with a second downlink control channel candidate of the second group of downlink control channel candidates.

32. The apparatus of claim 31, wherein the instructions are further executable by the at least one processor to cause the apparatus to:
determine that the one or more rules are satisfied based at least part on a first slot number of the first transmission time interval, a first frame number associated with the first transmission time interval, a first offset of the first search space set, a second slot number of the second transmission time interval, a second frame number associated with the second transmission time interval, a second offset of the second search space set, or any combination thereof, wherein the second frame number multiplied by the number of slots per frame plus the second slot number of slots is greater than the first frame number multiplied by the number of slots per frame plus the second slot number, which is greater than the second frame number multiplied by the number of frames per slot plus the second slot number minus the period of the same periodicity of the first search space set and the second search space set.

33. The apparatus of claim 32, wherein the instructions are further executable by the at least one processor to cause the apparatus to:
order the first search space set and the second search space set, wherein determining that the one or more rules are satisfied is based at least in part on ordering the first search space set and the second search space set.

34. The apparatus of claim 33, wherein the instructions are further executable by the at least one processor to cause the apparatus to:
receive, from the base station, an indication that the first search space set is ordered before the second search space set.

35. The apparatus of claim 33, wherein the instructions are further executable by the at least one processor to cause the apparatus to:
identify a first index for the first search space set and a second index for the second search space set, wherein comparing the first monitoring pattern and the second monitoring pattern comprises comparing the first index with the second index.

36. The apparatus of claim 31, wherein the instructions are further executable by the at least one processor to cause the apparatus to:
receive, based at least in part on the one or more rules being satisfied, a first repetition of a downlink control message on the first downlink control channel candidate and a second repetition of the downlink control message on the second downlink control channel candidate; and
combine the first repetition of the downlink control message and the second repetition of the downlink control message.

37. The apparatus of claim 31, wherein the instructions are further executable by the at least one processor to cause the apparatus to:
determine, based at least in part on determining whether the one or more rules are satisfied, that the first transmission time interval is located prior to the second transmission time interval.

38. The apparatus of claim 30, wherein a duration of the first search space set within a period of the first monitoring pattern is the same as a duration of the second search space set within a period of the second monitoring pattern.

39. The apparatus of claim 38, wherein the duration comprises a slot.

40. The apparatus of claim 38, wherein the duration comprises a set of consecutive transmission time intervals.

41. The apparatus of claim 30, wherein the instructions are further executable by the at least one processor to cause the apparatus to:
verify that the number of monitoring occasions of the first monitoring pattern is the same as the number of monitoring occasions of the second monitoring pattern;
determine, based at least in part on verifying that the first monitoring pattern and the second monitoring pattern have the same number of monitoring occasions, that a first monitoring occasion of the first search space set is linked with a second monitoring occasion of the second search space set; and
determine, based at least in part on determining the first monitoring occasion is linked with the second monitoring occasion, that a first downlink control channel candidate of the first group of downlink control channel candidates is linked with a second downlink control channel candidate of the second group of downlink control channel candidates.

42. The apparatus of claim 41, wherein the instructions are further executable by the at least one processor to cause the apparatus to:
receive, based at least in part on the monitoring, a first repetition of a downlink control message on the first downlink control channel candidate and a second repetition of the downlink control message on the second downlink control channel candidate; and
combine the first repetition of the downlink control message and the second repetition of the downlink control message.

43. A non-transitory computer-readable medium storing code for wireless communications at a user equipment (UE), the code comprising instructions executable by at least one processor to:
receive, from a base station, a configuration that indicates a first monitoring pattern for a first search space set within a transmission time interval and a second monitoring pattern for a second search space set within the transmission time interval;
receive, from the base station, an indication that a first group of downlink control channel candidates in the first search space set are linked with a second group of downlink control channel candidates in the second search space set for downlink control channel repetition based at least in part on a number of monitoring occasions of the first monitoring pattern being the same as a number of monitoring occasions of the second monitoring pattern; and
monitor the first group of downlink control channel candidates of the first search space set and the second group of downlink control channel candidates of the second search space set based at least in part on the first monitoring pattern and the second monitoring pattern having a same periodicity and offset.

44. A non-transitory computer-readable medium storing code for wireless communications at a user equipment (UE), the code comprising instructions executable by at least one processor to:
receive, from a base station, a configuration that indicates a first monitoring pattern for a first search space set within a first transmission time interval and a second monitoring pattern for a second search space set within a second transmission time interval;
receive, from the base station, an indication that a first group of downlink control channel candidates in the first search space set are linked with a second group of downlink control channel candidates in the second search space set for downlink control channel repetition based at least in part on a number of monitoring occasions of the first monitoring pattern being the same as a number of monitoring occasions of the second monitoring pattern; and
monitor the first group of downlink control channel candidates of the first search space set and the second group of downlink control channel candidates of the second search space set based at least in part on the first search space set and the second search space set having a same periodicity but different offsets.

* * * * *